US010329070B2

(12) United States Patent
Wengerd

(10) Patent No.: US 10,329,070 B2
(45) Date of Patent: Jun. 25, 2019

(54) FLUID INSULATION ASSEMBLY

(71) Applicant: Thermal Lock LLC, Jackson, WY (US)

(72) Inventor: Loren Wengerd, Jackson, WY (US)

(73) Assignee: Thermal Lock LLC, Jackson, WY (US)

( * ) Notice: Subject to any disclaimer, the term of this patent is extended or adjusted under 35 U.S.C. 154(b) by 0 days.

(21) Appl. No.: 15/372,149

(22) Filed: Dec. 7, 2016

(65) Prior Publication Data

US 2017/0158406 A1 Jun. 8, 2017

Related U.S. Application Data

(60) Provisional application No. 62/264,251, filed on Dec. 7, 2015.

(51) Int. Cl.
*B65D 81/24* (2006.01)
*A47G 19/12* (2006.01)
(Continued)

(52) U.S. Cl.
CPC ......... *B65D 81/245* (2013.01); *A47G 19/127* (2013.01); *A47G 19/2288* (2013.01);
(Continued)

(58) Field of Classification Search
CPC .. B65D 83/0044; B65D 81/245; B65D 25/06; B65D 25/42; B65D 83/0005; B65D 83/0033; B65D 83/005; B65D 83/64; B65D 83/34; B65D 7/0227; B65D 11/18; B65D 25/04; A47G 19/2272; A47J 31/38;
(Continued)

(56) References Cited

U.S. PATENT DOCUMENTS 2,946,491 A 7/1960 Bramming
3,924,774 A * 12/1975 Donnelly ............... B65D 43/26
220/200

(Continued)

FOREIGN PATENT DOCUMENTS

CN 201223316 Y 4/2009
EP 0 182 752 A2 5/1986

OTHER PUBLICATIONS

International Search Report and Written Opinion dated Mar. 21, 2017, issued in corresponding International Application No. PCT/US2016/065434, filed Dec. 7 2016, 11 pages.

*Primary Examiner* — Patrick M. Buechner
*Assistant Examiner* — Robert K Nichols, II
(74) *Attorney, Agent, or Firm* — Christensen O'Connor; Johnson Kindness PLLC

(57) ABSTRACT

A fluid insulation assembly for use with a container that is configured to contain a fluid includes a barrier assembly configured to fluidly isolate a first fluid chamber within an interior of a container, wherein the first fluid chamber is configured to contain a fluid, and an actuation assembly configured to dispense fluid contained within the first fluid chamber.
A method for insulating a fluid within a container and dispensing the fluid from the container includes fluidly isolating a first fluid chamber within an interior of a container and moving a barrier assembly disposed within the interior of the container in a first direction for dispensing fluid contained within the first fluid chamber.

6 Claims, 18 Drawing Sheets

(51) Int. Cl.
  *A47G 19/22* (2006.01)
  *A47J 31/38* (2006.01)
  *B65D 25/06* (2006.01)
  *B65D 25/42* (2006.01)
  *A47J 41/00* (2006.01)

(52) U.S. Cl.
  CPC .............. *A47J 31/38* (2013.01); *A47J 41/00* (2013.01); *B65D 25/06* (2013.01); *B65D 25/42* (2013.01)

(58) Field of Classification Search
  CPC .. Y10S 206/818; B01F 13/08; B05B 11/0048; B05B 11/02; B05B 9/047; B05B 9/0838; B05C 17/00576; B05C 17/01; A61C 5/064
  USPC .............................. 222/205, 326, 386.5, 386
  See application file for complete search history.

(56) References Cited

U.S. PATENT DOCUMENTS

| | | | | |
|---|---|---|---|---|
| 4,741,737 A | * | 5/1988 | Meyer | A61M 5/20 604/140 |
| 5,761,987 A | | 6/1998 | Leon et al. | |
| 5,961,004 A | | 10/1999 | DeMars | |
| 6,290,105 B1 | * | 9/2001 | Cosentino | B65D 47/30 222/386 |
| 6,488,173 B2 | | 12/2002 | Milan | |
| 8,267,275 B2 | | 9/2012 | Peitersen | |
| 8,469,227 B2 | | 6/2013 | Tripsiznes | |
| 8,794,479 B2 | | 8/2014 | Lin | |
| 9,016,508 B1 | * | 4/2015 | Leighton | B65D 81/245 220/545 |
| 9,855,536 B2 | * | 1/2018 | Nguyen | B01F 13/08 |
| 2003/0063945 A1 | * | 4/2003 | Gueret | A45D 34/042 401/170 |
| 2005/0238540 A1 | * | 10/2005 | Swon | B01F 11/0082 422/561 |
| 2007/0000950 A1 | * | 1/2007 | Ingram | A61M 15/0028 222/320 |
| 2009/0022859 A1 | * | 1/2009 | Foster | B65D 77/28 426/115 |
| 2011/0290826 A1 | * | 12/2011 | Harris | B65D 83/0044 222/319 |
| 2013/0341359 A1 | | 12/2013 | Vanier | |
| 2014/0054314 A1 | * | 2/2014 | Kern | A61J 1/062 222/1 |
| 2015/0321807 A1 | * | 11/2015 | Cotton | A47G 19/12 220/227 |

\* cited by examiner

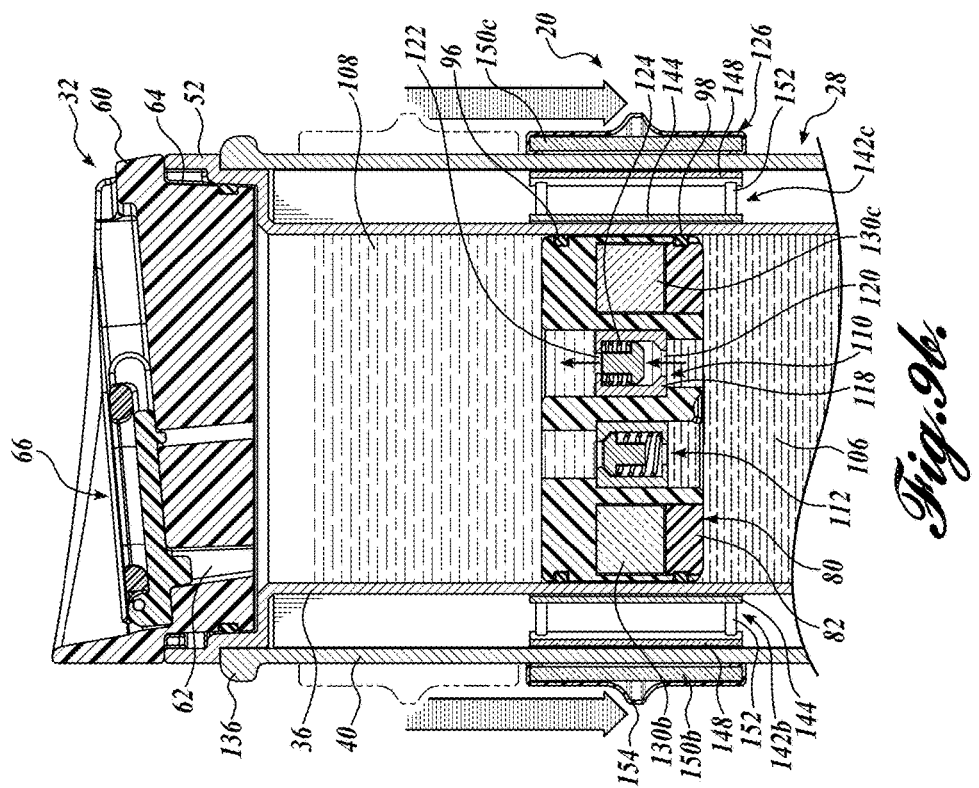
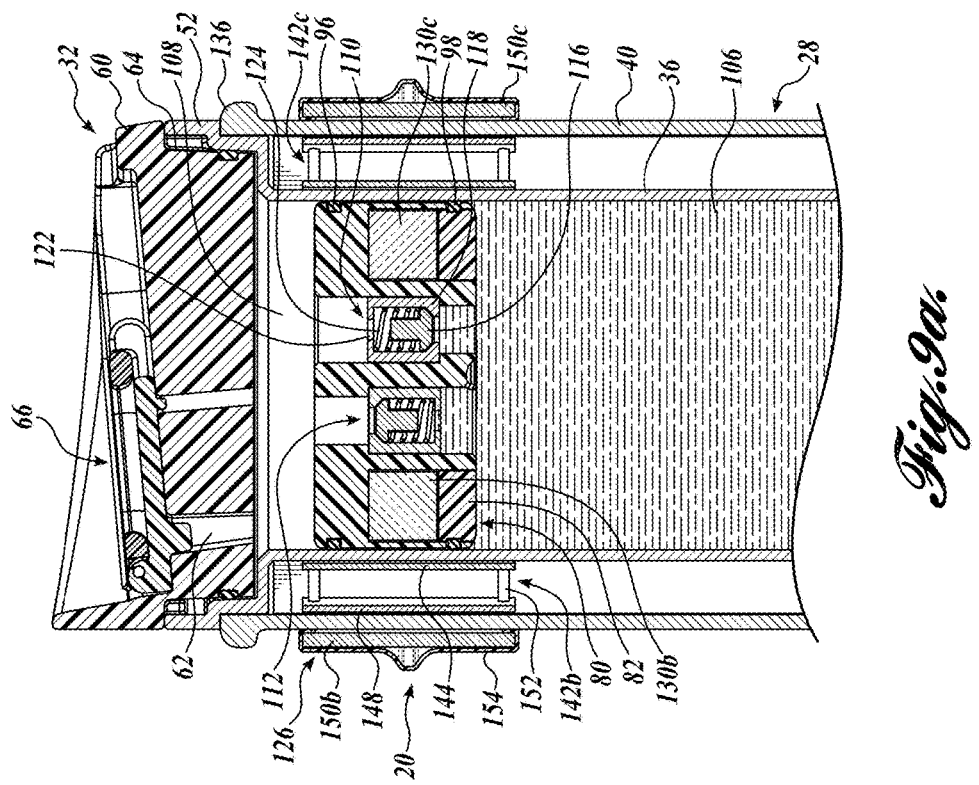

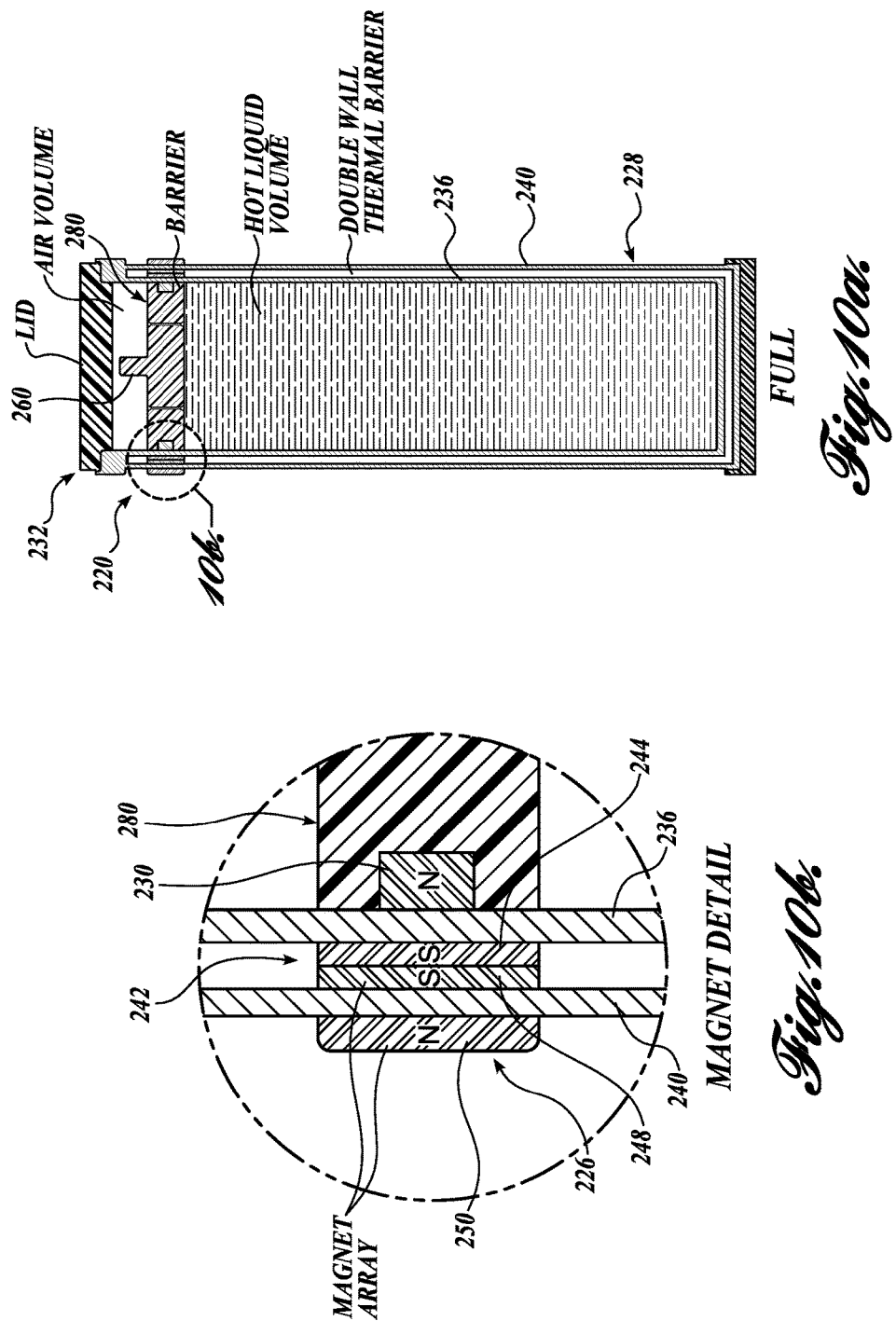

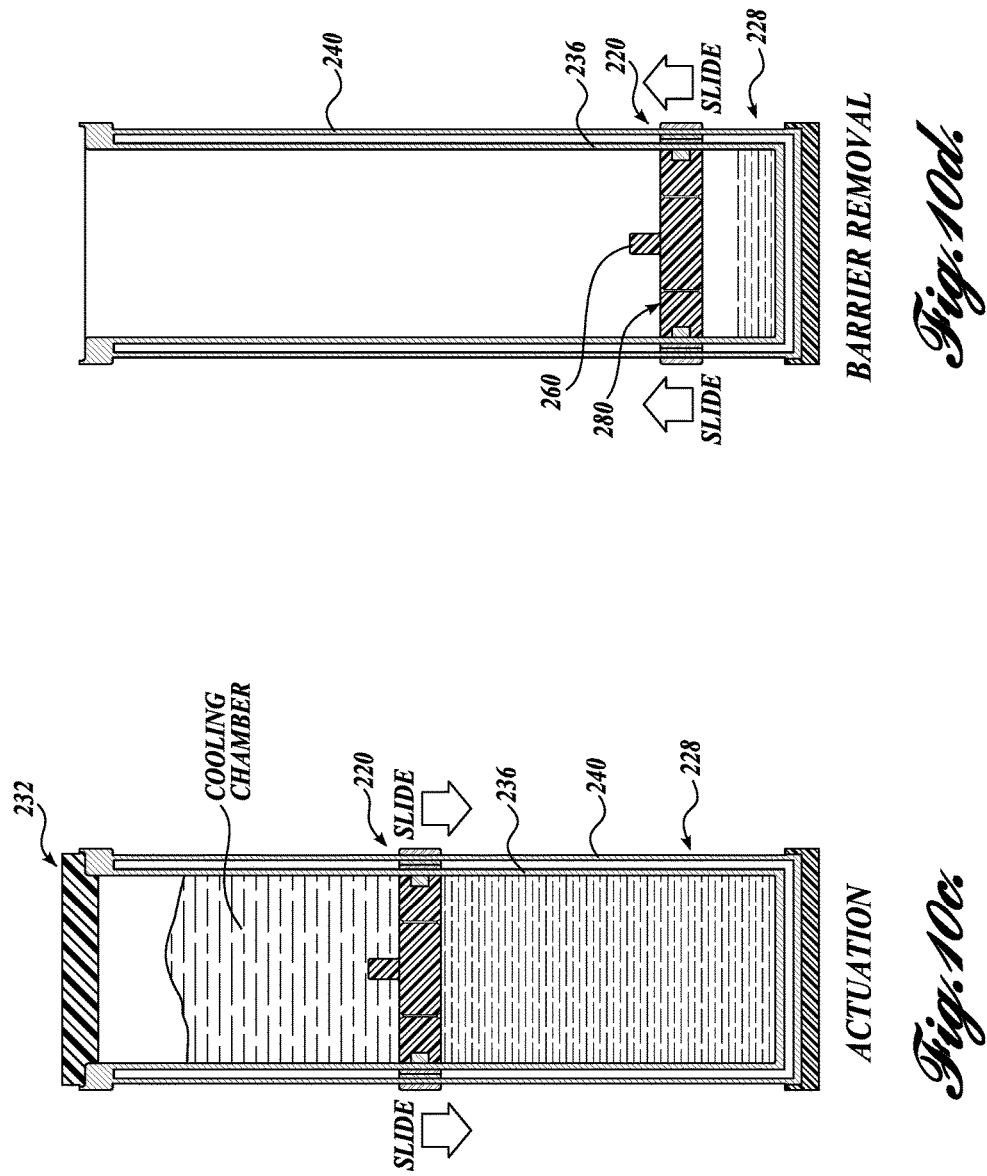

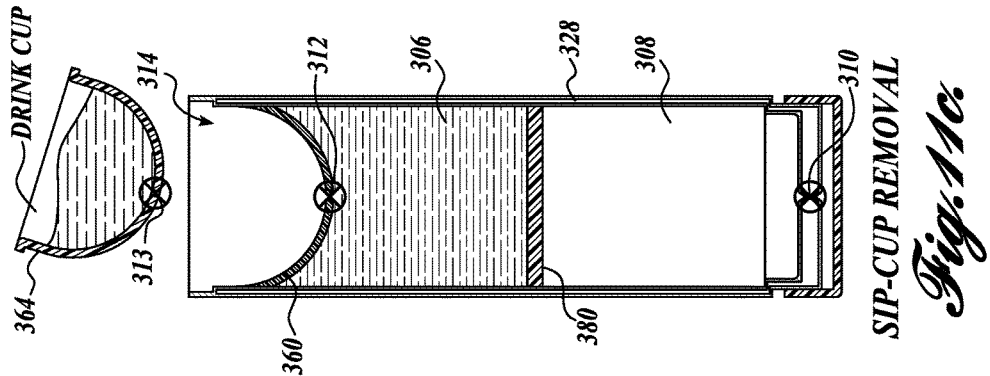
Fig. 11c. SIP-CUP REMOVAL
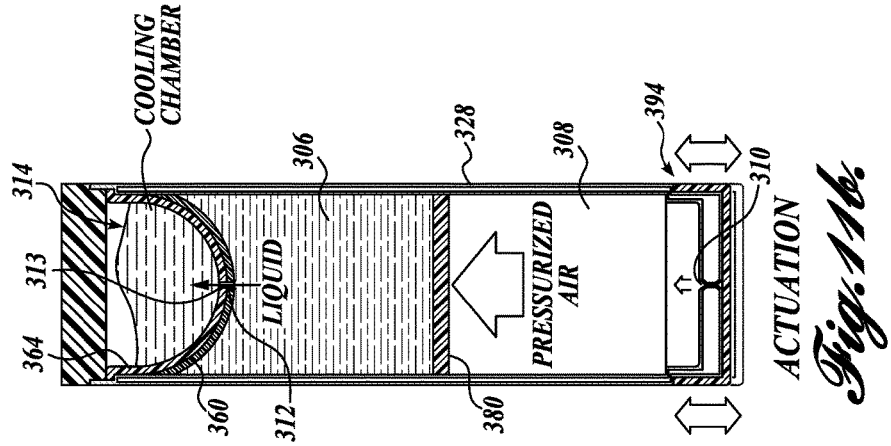
Fig. 11b. ACTUATION
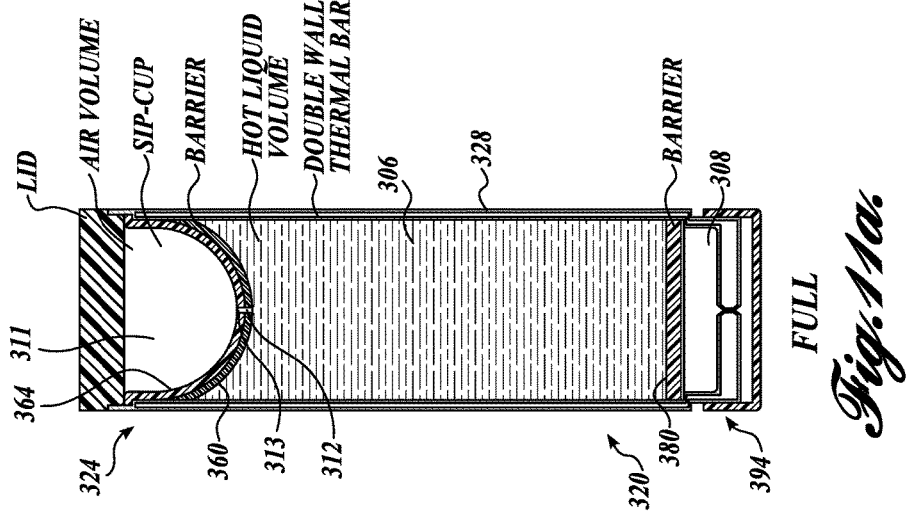
Fig. 11a. FULL

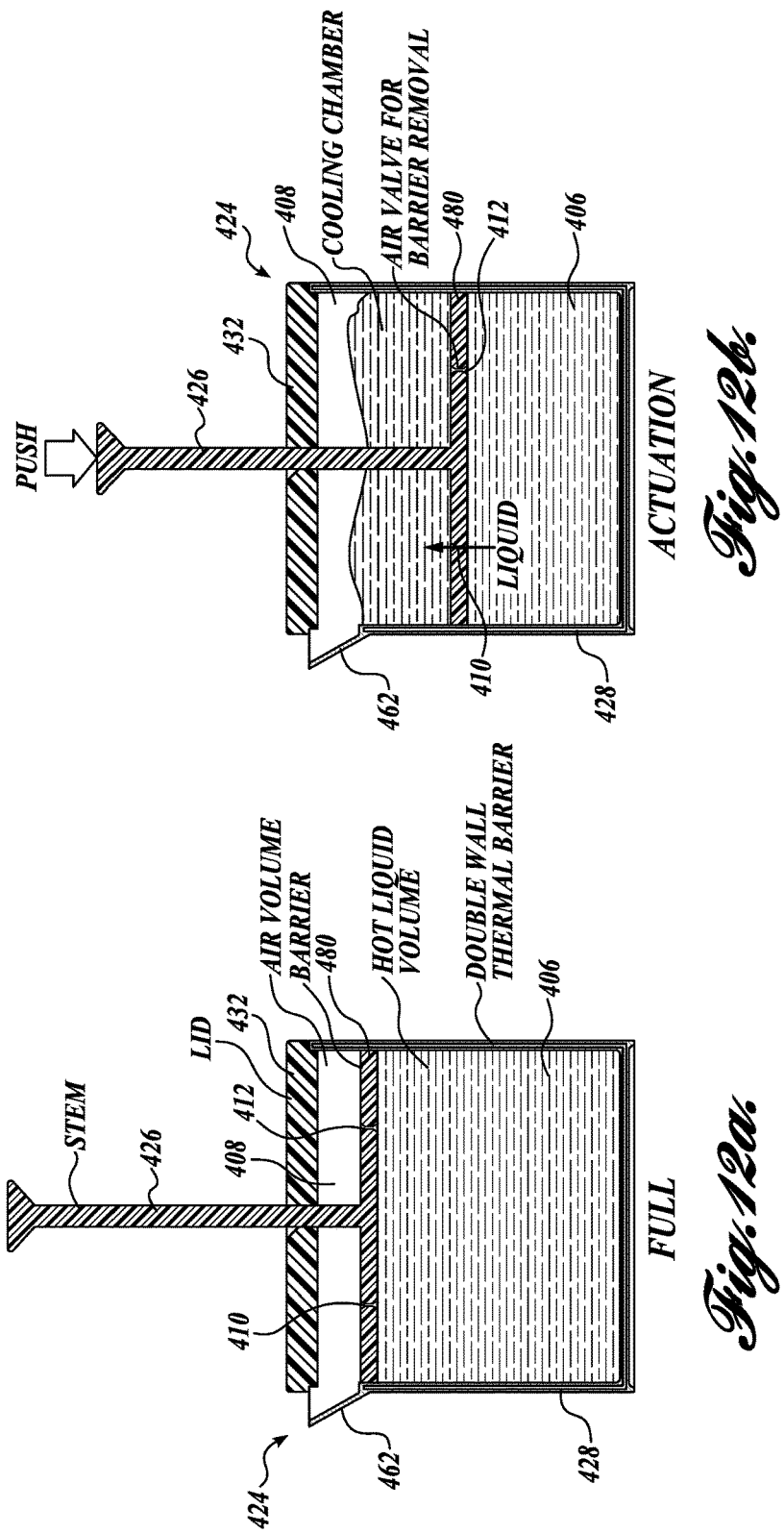

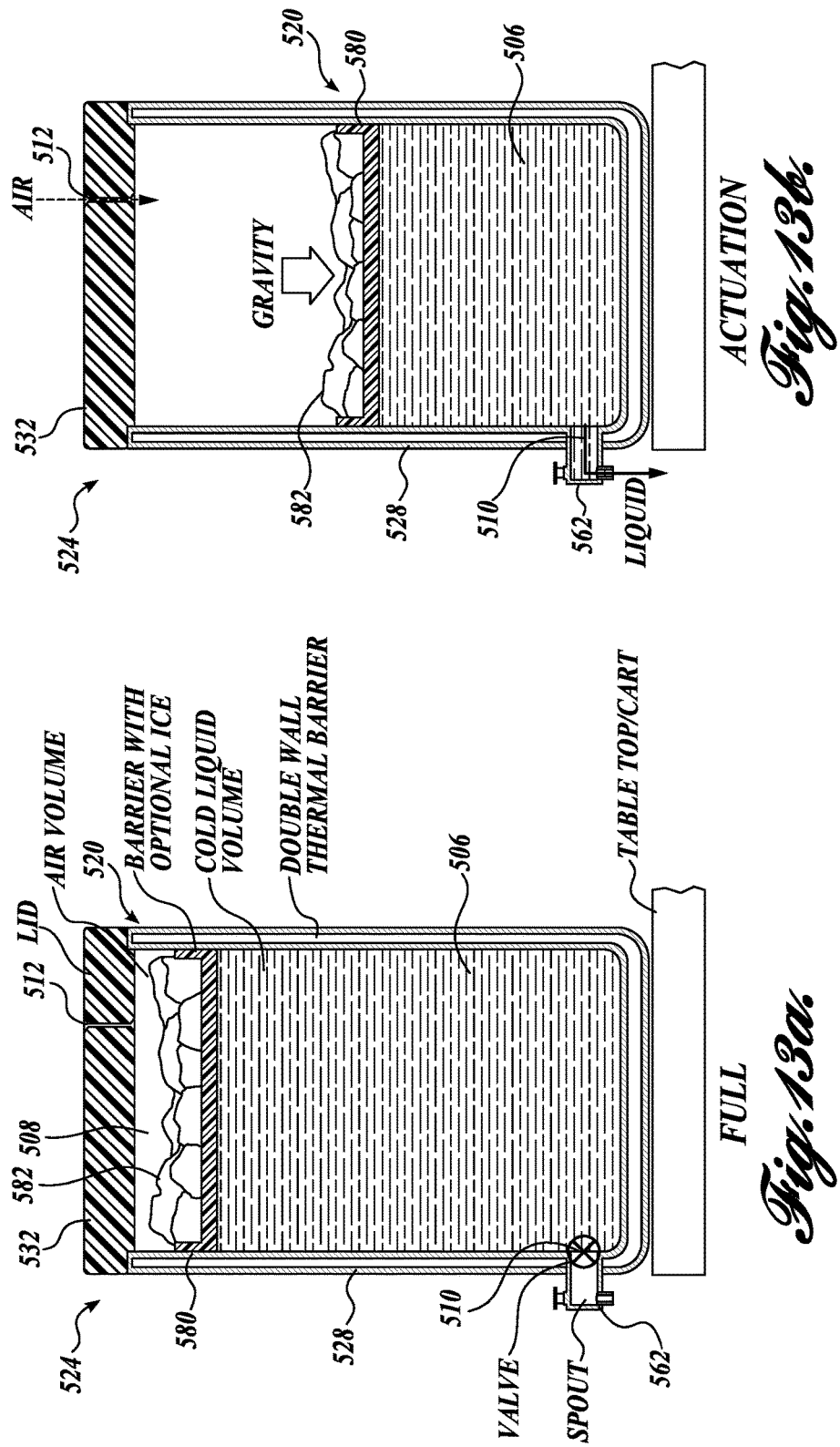

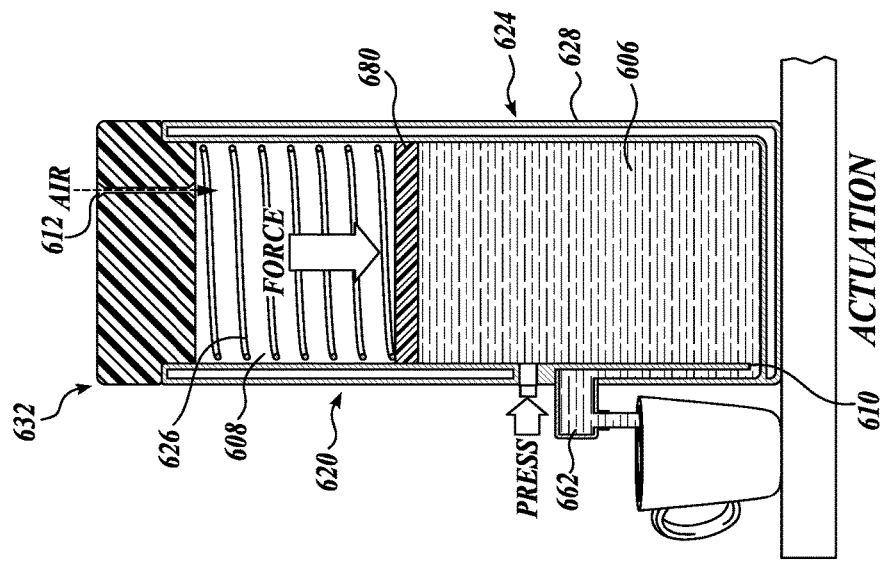
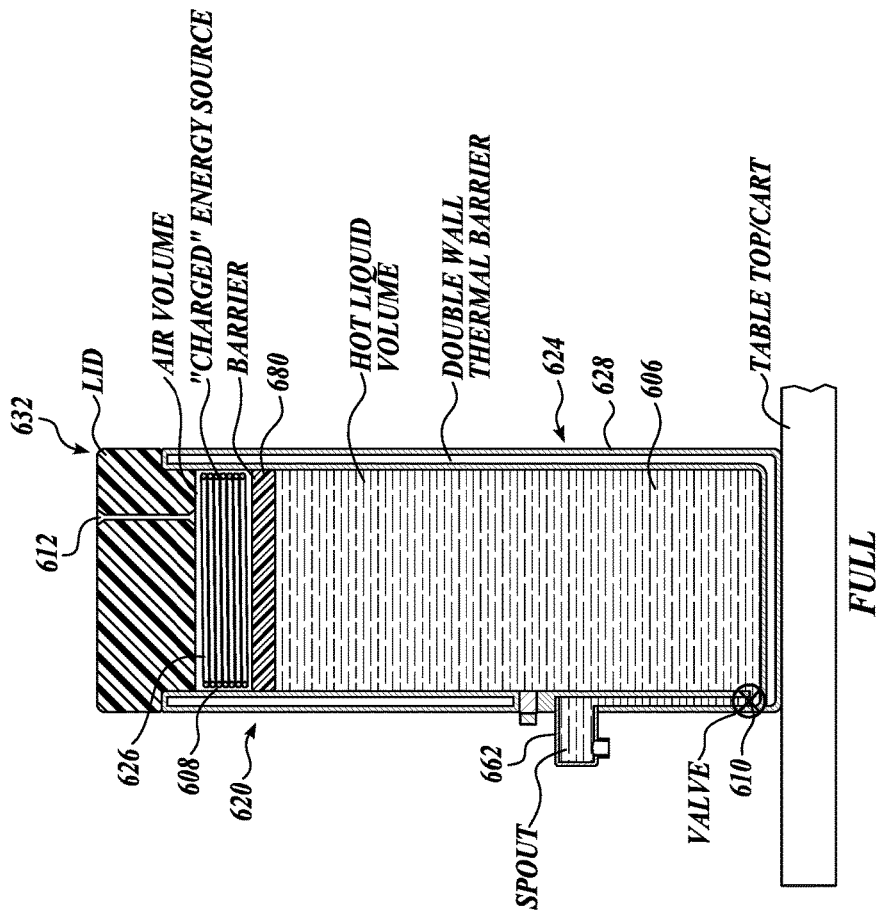

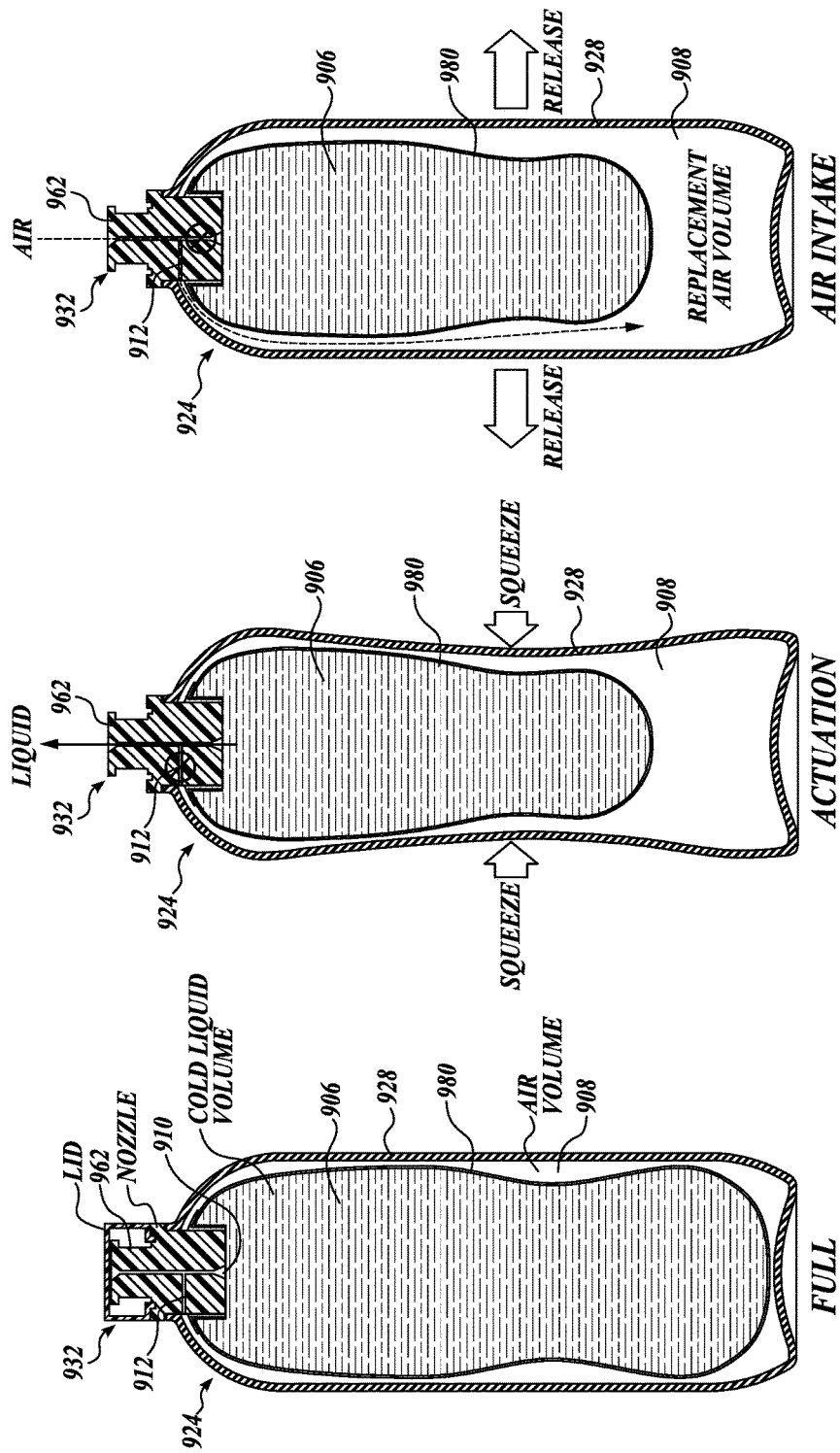

FLUID INSULATION ASSEMBLY

CROSS-REFERENCE TO RELATED APPLICATION

This application claims the benefit of U.S. Provisional Application No. 62/264,251, filed Dec. 7, 2015, the disclosure of which is hereby expressly incorporated by reference in its entirety.

BACKGROUND

Many different types of mugs, cups, carafes, butlers, bottles, coolers, and other beverage containers are available to keep a consumable liquid, such as coffee, hot or cold for an extended period of time. However, known beverage containers do not have the ability to keep the liquid hot or cold once the liquid begins to be consumed; i.e., when the liquid comes into contact with ambient air. In other words, the contained liquid immediately begins to rapidly lose its desired steady-state temperature due to energy loss into the ambient air it is contacting.

More specifically, if the liquid is hot, the temperature of the liquid begins to decrease in temperature or otherwise lose heat as soon as it contacts ambient air. Conversely, if the liquid is cold, the temperature of the liquid begins to increase in temperature as soon as it contacts ambient air. For instance, a typical insulated personal size coffee mug allows the liquid to contact ambient air when the consumer opens the drinking spout to consume the liquid. The same situation occurs for other insulated hot/cold beverage containers, such as a carafe (where the liquid contacts ambient air as soon as the carafe is opened to pour liquid), a butler (where the liquid contacts ambient air when the liquid is pumped out of the butler), a bottle (where liquid contacts ambient air as soon as the lid is opened), etc.

Thus, a need exists for a liquid insulation assembly that can be used in a beverage container, such as a mug, cup, carafe, butler, bottle, cooler, etc., that is configured to maintain the hot or cold temperature of the contained liquid by eliminating the possibility of the liquid coming into contact with ambient air temperatures when the liquid begins to be consumed.

Such an insulation assembly would also be useful in other applications aside from insulating consumable beverages, such as for use with gaseous fluids. In that regard, embodiments of the present disclosure will be hereinafter referred to as a "fluid insulation assembly."

SUMMARY

A fluid insulation assembly for use with a container that is configured to contain a fluid includes a barrier assembly configured to fluidly isolate a first fluid chamber within an interior of a container, wherein the first fluid chamber is configured to contain a fluid, and an actuation assembly configured to dispense fluid contained within the first fluid chamber.

A method for insulating a fluid within a container and dispensing the fluid from the container includes fluidly isolating a first fluid chamber within an interior of a container and moving a barrier assembly disposed within the interior of the container in a first direction for dispensing fluid contained within the first fluid chamber.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated by reference to the following detailed description, when taken in conjunction with the accompanying drawings, wherein:

FIG. 9A is a partial cross-sectional view of the fluid insulation assembly of FIG. 7 shown in a first position;

FIG. 9B is a partial cross-sectional view of the fluid insulation assembly of FIG. 7 shown in a second position;

FIG. 10A is a side cross-sectional view of a fluid insulation assembly formed in accordance with a first alternative exemplary embodiment of the present disclosure, wherein a barrier assembly is shown in a first position;

FIG. 10B is a detailed view of a portion of an actuator assembly of the fluid insulation assembly of FIG. 10A;

FIG. 10C is a side cross-sectional view of the fluid insulation assembly of FIG. 10A, wherein the barrier assembly is shown in a second position;

FIG. 10D is a side cross-sectional view of the fluid insulation assembly of FIG. 10A, wherein the barrier assembly is shown in a third position;

FIG. 11A is a side cross-sectional view of a fluid insulation assembly formed in accordance with a second alternative exemplary embodiment of the present disclosure, wherein a barrier assembly is shown in a first position;

FIG. 11B is a side cross-sectional view of the fluid insulation assembly of FIG. 11A, wherein the barrier assembly is shown in a second position;

FIG. 11C is a side cross-sectional view of the fluid insulation assembly of FIG. 11A, wherein a portion of a container in which the fluid insulation assembly is embodied has been removed;

FIG. 12A is a side cross-sectional view of a fluid insulation assembly formed in accordance with a third alternative exemplary embodiment of the present disclosure, wherein a barrier assembly is shown in a first position;

FIG. 12B is a side cross-sectional view of the fluid insulation assembly of FIG. 12A, wherein the barrier assembly is shown in a second position;

FIG. 13A is a side cross-sectional view of a fluid insulation assembly formed in accordance with a fourth alternative exemplary embodiment of the present disclosure, wherein a barrier assembly is shown in a first position;

FIG. 13B is a side cross-sectional view of the fluid insulation assembly of FIG. 13A, wherein the barrier assembly is shown in a second position;

FIG. 14A is a side cross-sectional view of a fluid insulation assembly formed in accordance with a fifth alternative exemplary embodiment of the present disclosure, wherein a barrier assembly is shown in a first position;

FIG. 14B is a side cross-sectional view of the fluid insulation assembly of FIG. 14A, wherein the barrier assembly is shown in a second position;

FIG. 17A is a side cross-sectional view of a fluid insulation assembly formed in accordance with a eighth alternative exemplary embodiment of the present disclosure, wherein a barrier assembly is shown in a first position;

FIG. 17B is a side cross-sectional view of the fluid insulation assembly of FIG. 17A, wherein the barrier assembly is shown in a second position and an actuator assembly is shown in a first position; and FIG. 17C is a side cross-sectional view of the fluid insulation assembly of FIG. 17A, wherein the actuator assembly is shown in a second position.

DETAILED DESCRIPTION

Figure 1:
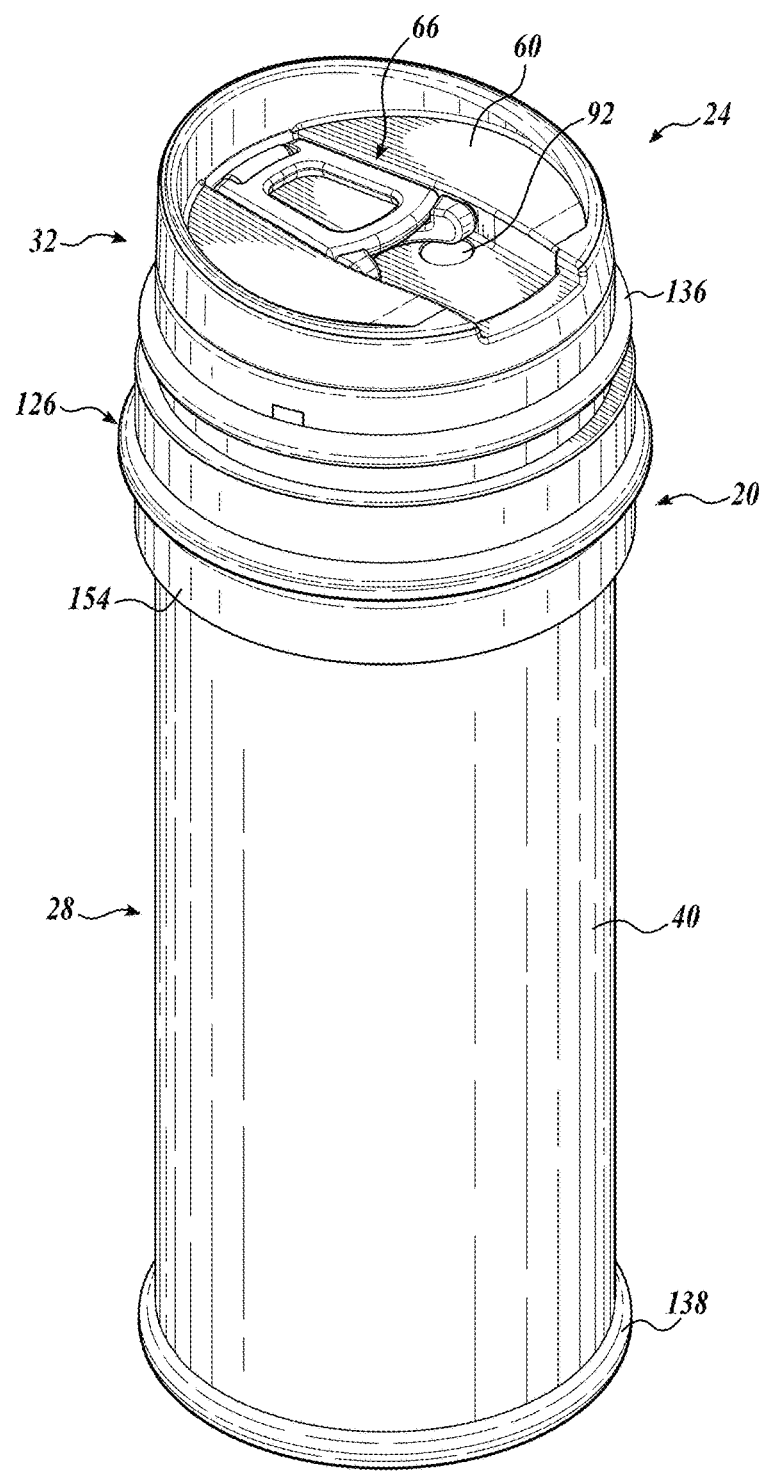
FIG. 1 is an isometric view of a fluid insulation assembly formed in accordance with a first exemplary embodiment of the present disclosure.
Figure 2:
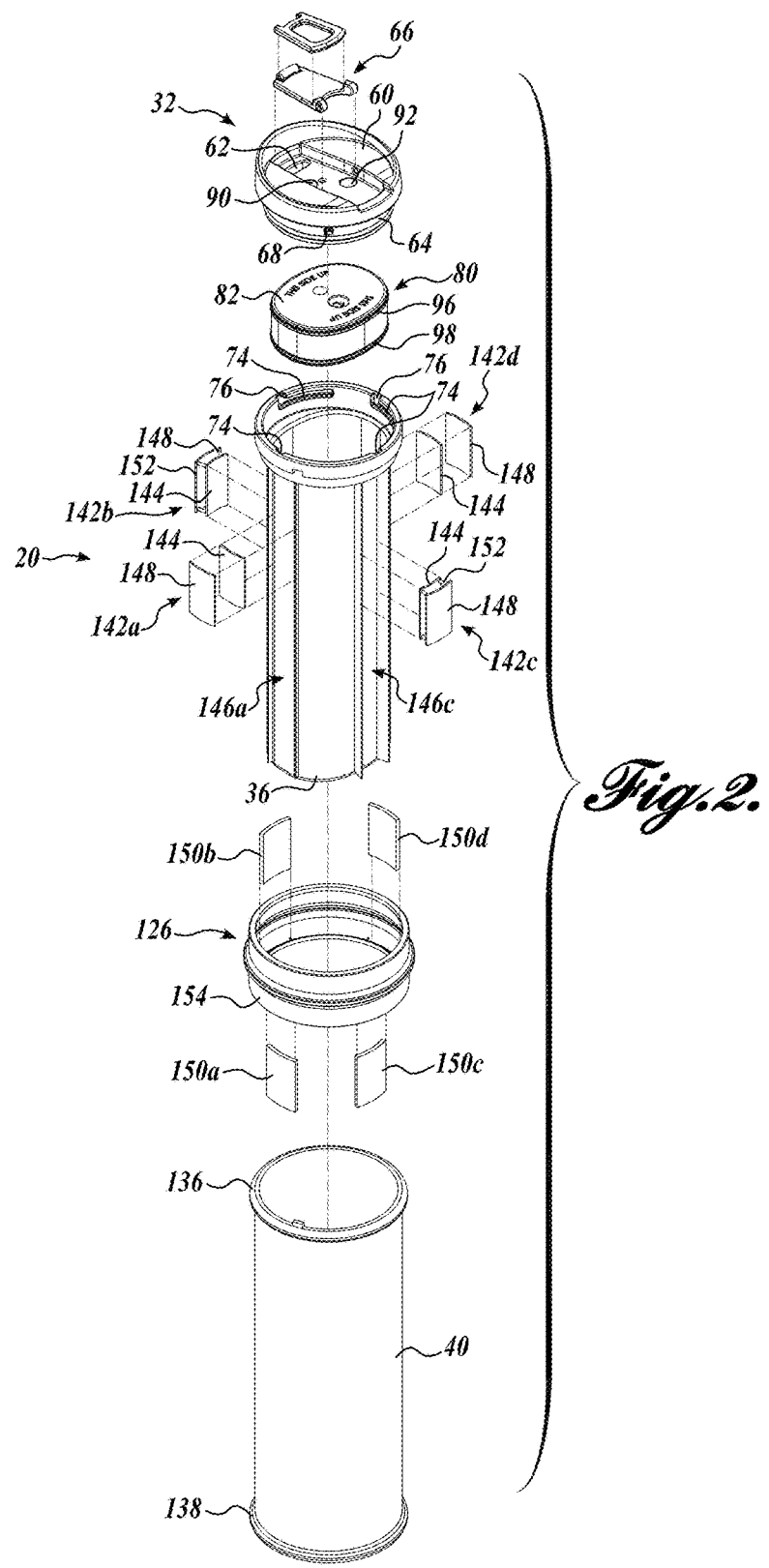
FIG. 2 is a top exploded view of the fluid insulation assembly of FIG. 1.
Figure 3:
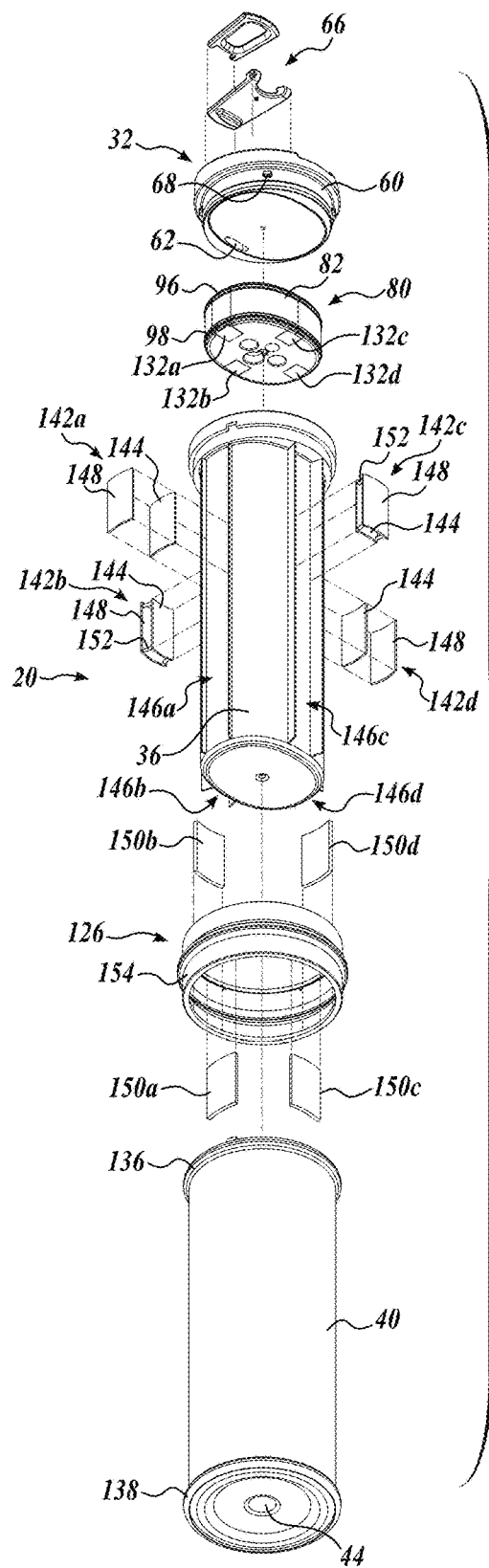
FIG. 3 is a bottom exploded view of the fluid insulation assembly of FIG. 1.
Figure 4:
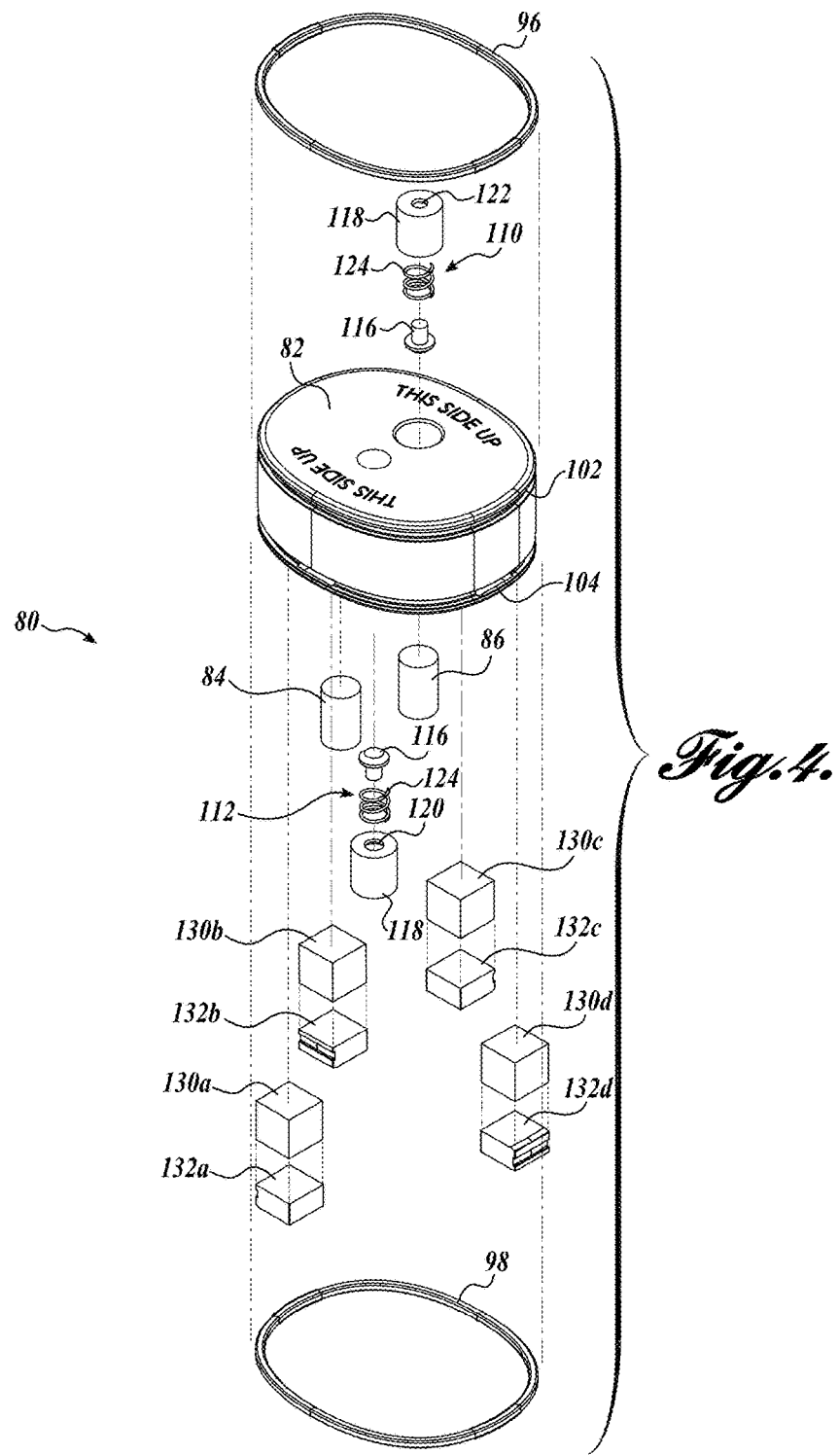
FIG. 4 is a top exploded view of a barrier subassembly of the fluid insulation assembly shown in FIGS. 1-3.
Figure 5:
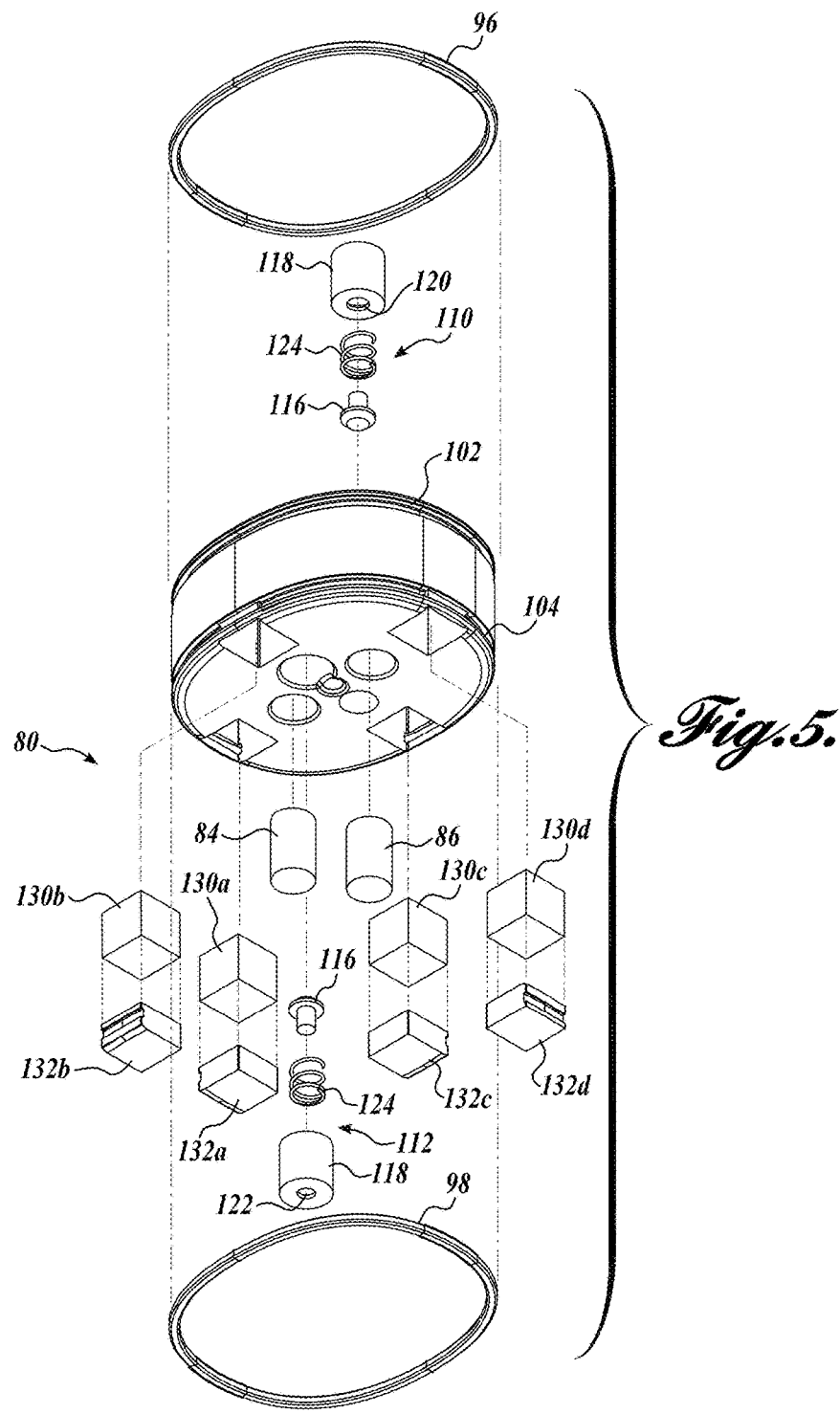
FIG. 5 is a bottom exploded view of the barrier subassembly of FIG. 4.
Figure 6:
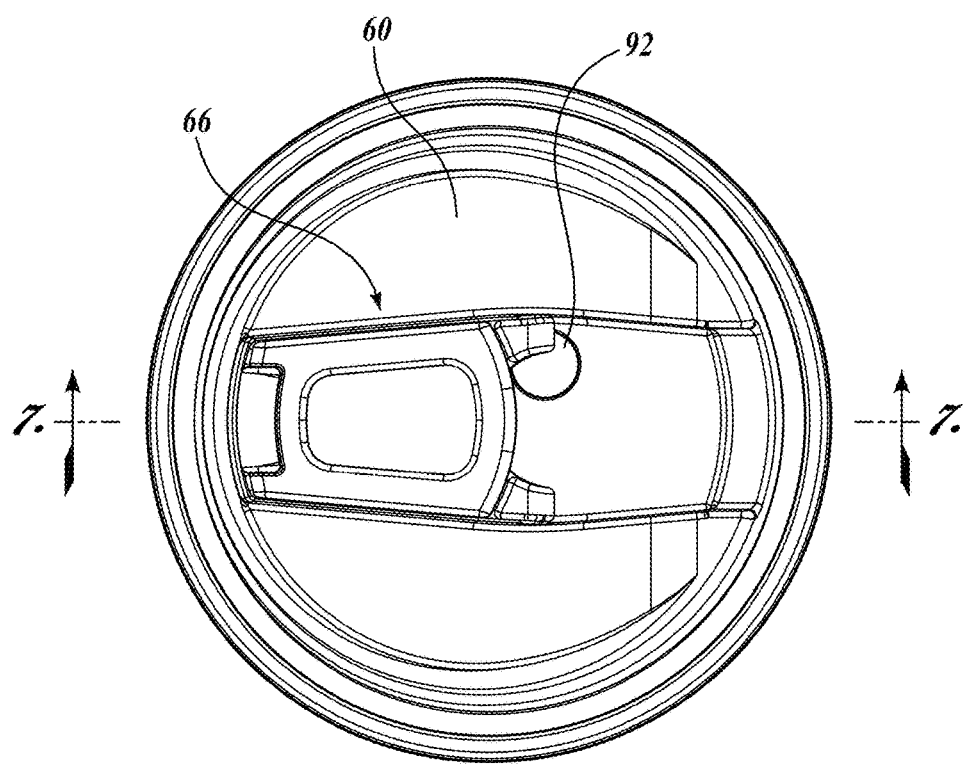
FIG. 6 is a top view of the fluid insulation assembly of FIG. 1.

Referring to FIGS. 1-9, an exemplary embodiment of a fluid insulation assembly 20 for maintaining the steady state (hot or cold) temperature of a selected amount of fluid contained within a fluid container, even once the contained fluid is accessed for consuming or other use, will now be described. In the embodiment depicted, the fluid insulation assembly 20 is incorporated into a personal size insulated beverage container 24 for holding and dispensing hot or cold fluids. It should be appreciated that the fluid insulation assembly 20 may instead be incorporated into a fluid container of any other various size, shape and configuration, such as a coffee carafe, a coffee butler, a 5 gallon drink dispenser, a bottle, or any other type of non-beverage container. Accordingly, the descriptions and illustrations provided herein should not be seen as limiting the scope of the claimed subject matter.

Referring to FIGS. 1-3, 6, and 7, the personal size insulated beverage container 24 into which the fluid insulation assembly 20 is incorporated will first be described. The beverage container 24 includes an insulated container body 28 having an upper open end that is selectively enclosable by a lid assembly 32. The container body 28 includes an inner liner 36 disposed within and spaced apart from an outer container 40 in a vacuum-sealed configuration well known in the art for insulating any fluid container therein. As can be appreciated by one of ordinary skill, heat transfer occurs between components when the components are in physical contact with each other. Accordingly, the inner liner 36 is only in minimal contact with the outer container 40 at its upper and lower ends to appropriately secure and position the inner liner 36 within the outer container 40.

Figure 7:
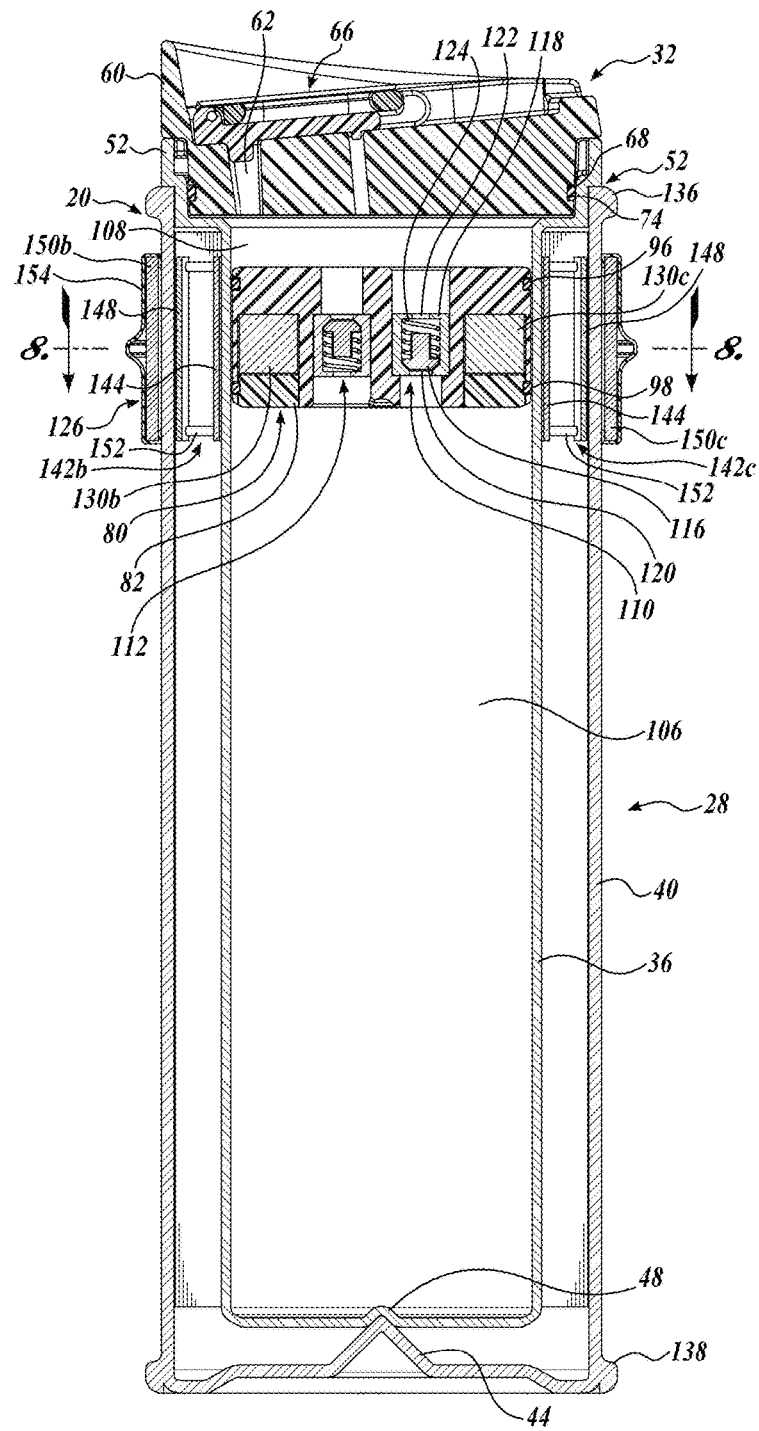
FIG. 7 is a cross-sectional view of the fluid insulation assembly of FIG. 6, taken substantially across line 7-7.

In the depicted embodiment, as can best be seen by referring to FIG. 7, the outer liner 40 includes an inwardly extending pointed protrusion 44 at its lower end, the pointed tip of which is receivable within a correspondingly-shaped indentation 48 defined in the lower end of the inner liner 36. The inwardly extending pointed protrusion 44 is a suitable height to appropriately space the inner liner 36 from the outer container 40 at the bottom end of the container body 28. At the same time, the upper end of the inner liner 36 includes a stepped upper edge 52 that is mateable with a correspondingly-shaped upper lip 56 of the outer container 40 to appropriately space the inner liner 36 from the outer container 40 at the upper end of the container body 28. The inner liner 36 is vacuum-sealed within the outer container 40 in a manner well known in the art.

It should be appreciated that the inner liner 36 may be sealed within and spaced apart from the outer container 40 in any other suitable manner. Furthermore, as noted above, the fluid insulation assembly 20 may be incorporated into any suitable fluid container. Accordingly, any suitable container and/or body configuration may instead be used.

The lid assembly 32 is configured to be removably secured to the upper open end of the container body 28 for containing a fluid and for providing selective access to the fluid for consumption or other use. In that regard, the lid assembly 32 includes a lid opening 62 and a corresponding vent opening (not labeled) that is selectively closeable by a lid closure assembly 66. Any suitable lid closure assembly 66 that can be moved into an out of engagement with the lid opening 62 for sealing the lid opening 62 closed and for allowing fluid to flow out of the lid opening 62 may be used.

The lid assembly 32 also includes a lid body 60 that is generally circular in cross-sectional shape (see FIG. 6) such that it may be removably secured within a generally circular opening defined at the upper end of the container body 28. More specifically, the stepped upper edge 52 of the inner liner 36 includes an upwardly extending portion that is configured to removeably receive a bottom reduced diameter portion 64 of the lid body 60. The lid body 60 is removably secured within the stepped upper edge 52 in a manner that locks the lid body 60 into a preselected diametric location within the inner liner 36, such as a quarter turn, from an initial, unlocked position.

In that regard, a suitable fastening mechanism, such as a bayonet connector, may be defined between the stepped upper edge 52 of the inner liner 36 and the bottom reduced diameter portion 64 of the lid body 60. For instance, first and second bayonet pins 68 and 70 extending in diametrically opposite positions from the exterior of the bottom reduced diameter portion 64 are insertable into correspondingly-shaped bayonet channels 74 defined in the interior of the stepped upper edge 52. The bayonet pins 68 and 70 may be inserted into opposing bayonet channels 74 and thereafter turned a predetermined amount (to the end of the channel 74), such as a quarter turn, into a second, locked position. Each bayonet channel 74 may include a vertical channel portion 76 at the entry of the channel to guide the pin 68 or 70 into and out of the channel. When the pins 68 and 70 are received within the vertical channel 76, it also defines the initial, unlocked position of the lid body 60 within the inner liner 36.

The bayonet connector ensures that the lid body 60 will be locked into place within the inner liner 36 at a predetermined diametric location. As will become further appreciated below, when the lid body 60 is in the locked position, the lid assembly 32 may appropriately disengage and therefore activate a portion of the fluid insulation assembly 20. Likewise, when the lid body 60 is in the unlocked position, the lid assembly 32 may appropriately engage and therefore deactivate a portion of the fluid insulation assembly 20. It should be appreciated that any other suitable fastening mechanism may instead be used to lock the lid body 60 into a predetermined diametric location within the inner liner 36.

When moved between the locked and unlocked positions, the lid body 60 is configured to engage and disengage, respectively, a portion of a fluid/air barrier assembly of the fluid insulation assembly 20, which is configured to prevent a selected amount of fluid contained within the container body 28 from contacting ambient air or another fluid. In the depicted embodiment, the barrier assembly is defined by a floating barrier 80, such as a floating piston or puck that is slidably receivable within the interior of the inner liner 36.

Figure 8:
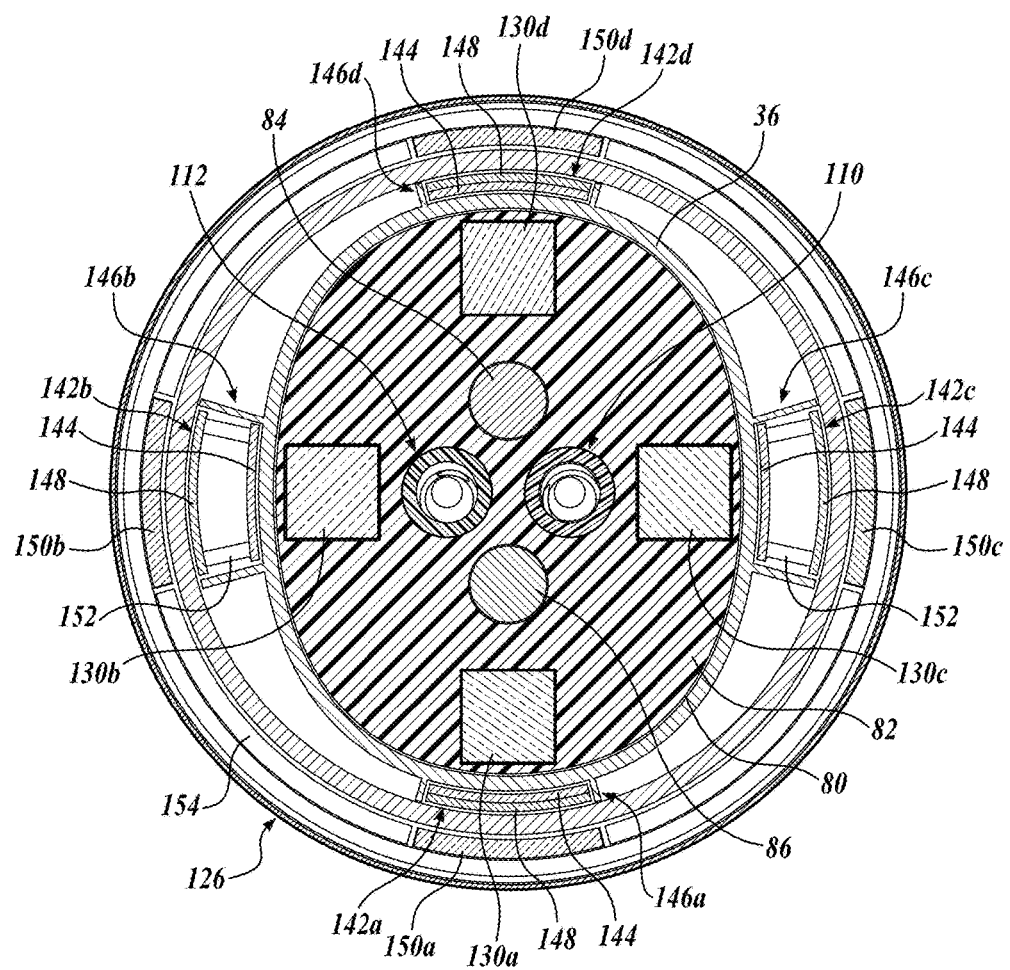
FIG. 8 is a cross-sectional view of the fluid insulation assembly of FIG. 7, taken substantially across line 8-8.

Referring to FIGS. 2-5, 7, and 8, the interior of the inner liner 36 is substantially elliptical in cross-sectional shape (see FIG. 8). In that regard, the floating barrier 80 includes a barrier body 82 that is also substantially elliptical in cross-sectional shape to substantially match the interior shape of the inner liner 36. In this manner, the floating barrier 80 can slide vertically within the inner liner 36 without rotating.

The floating barrier 80 includes at least one magnet disposed in the barrier body 82 that is configured to align with and be attracted to at least one magnet disposed in the lid body 60. In the depicted embodiment, first and second lid-attracting magnets 84 and 86 disposed within the barrier body 82 are alignable with and attracted to first and second barrier-attracting magnets 90 and 92 disposed in the lid body 60 when the lid assembly 32 is in the initial, unlocked position. The first and second lid-attracting magnets 84 and 86 in the barrier body 82 are aligned with the first and second barrier-attracting magnets 90 and 92 in the lid body 60 when the lid assembly 32 is in the initial, unlocked position. In that regard, the floating barrier 80 is secured to and may be removed with the lid assembly 32 when the lid assembly 32 is in the initial, unlocked position. In other words, the floating barrier 80 essentially becomes a part of the lid assembly 32 and is removably therewith when the lid assembly 32 is in the initial, unlocked position. With the lid assembly 32 removed from the container body 28, a hot or cold fluid may be poured therein.

When the lid assembly 32 is placed onto the container body 28 in the initial, unlocked position, the floating barrier 80 is at least partially disposed within the interior of the inner liner 36. As noted above, the interior of the inner liner 36 is substantially elliptical in cross-sectional shape (and substantially matches the cross-sectional shape of the barrier body 82) such that the floating barrier 80 cannot rotate within the inner liner 36. In that regard, when the lid assembly 32 is rotated into the second, locked position (for instance, a quarter turn), the floating barrier 80 does not rotate with the lid assembly 32. As such, the first and lid-attracting second magnets 84 and 86 in the barrier body 82 come out of alignment with the first and second barrier-attracting magnets 90 and 92 in the lid body 60, decoupling the floating barrier 80 from the lid assembly 32. In this decoupled state, the floating barrier 80 is free to slide vertically within the inner liner 36.

As noted above, the floating barrier 80 is configured to selectively prevent fluid contained within the container body 28 from contacting ambient air or another fluid. In general, the floating barrier 80 contains a fluid within a first fluid chamber 106 of the container body 28 defined beneath the floating barrier 80, and it allows a selected volume of that fluid to pass into a second fluid chamber 108 of the container body 28 defined above the floating barrier 80. Any fluid contained in the first fluid chamber 106 below the floating barrier 80 is prevented from contacting ambient air when dispensed, and thus remains at its steady state temperature. The fluid in the first fluid chamber 106 remains at its steady state temperature until it passes into the second fluid chamber 108 above the barrier for consumption or other use.

The floating barrier 80 includes a suitable sealing assembly for defining the first and second fluid chamber 106 and 108 above and below the floating barrier 80. In the depicted embodiment, the floating barrier 80 includes first and second O-rings 96 and 98 received within first and second annular grooves 102 and 104 disposed on the upper and lower edges of the barrier body 82. The O-rings 96 and 98 seal against the interior of the inner liner 36 while also allowing the floating barrier 80 to slide within the inner liner 36. Any other suitable sealing assembly may instead be used.

The fluid insulation assembly 20 includes a suitable fluid displacement assembly configured for selectively dispensing fluid contained within the first fluid chamber 106 for consumption while substantially preventing the contained fluid from contacting ambient air. In the depicted embodiment, the floating barrier 80 includes a suitable valve assembly for allowing fluid to pass from the first fluid chamber 106 (below the barrier) into the second fluid chamber 108 (above the barrier) for consumption of or access to the fluid. In that regard, the valve assembly allows fluid to pass from the first fluid chamber 106 into the second fluid chamber 108 while preventing air or any fluid in the second fluid chamber 108 from passing into the first fluid chamber 106. Although not shown, the valve assembly may instead be in fluid communication with any suitable structure for directing fluid out of the first fluid chamber 106, such as a straw, a tube, one or more channels, etc.

Although any suitable valve assembly may be used, in the depicted embodiment, the valve assembly includes a first one-way valve 110 configured to selectively allow fluid to flow from the first fluid chamber 106 into the second fluid chamber 108. Referring to FIGS. 4, 5, 9A and 9B, the first one-way valve 110 includes a valve closure member 116 moveably disposed within a valve housing 118. The valve housing 118 includes a first opening 120 defined at a first end that is configured to be placed into fluid communication with the first fluid chamber 106, and a second opening 122 defined at a second end that is configured to be placed into fluid communication with the second fluid chamber 108. The valve closure member 116 is biased into engagement with the first opening 120 through a biasing member 124, such as a spring, such that the first one-way valve 110 is normally closed. Upon the force of a predetermined amount of fluid pressure, the valve closure member 116 is moved out of engagement with the first opening 120 to allow fluid to flow from the first fluid chamber 106 into the second fluid chamber 108.

The fluid may be displaced upwardly through the first one-way valve 110 (from the first fluid chamber 106 into the second fluid chamber 108) in any suitable manner. In the depicted embodiment, the floating barrier 80 is moved downwardly within the inner liner 36, thereby increasing fluid pressure in the first fluid chamber 106 and forcing fluid up through the first one-way valve 110. The floating barrier 80 is moved downwardly within the inner liner 36 through any suitable actuation assembly.

In the depicted embodiment, the actuation assembly is generally defined by a plurality of magnets disposed within the floating barrier 80 that are moveable by a plurality of magnets disposed within the container body 28 and an outer ring assembly 126. In general, the outer ring assembly 126 slides axially along the exterior surface of the outer container 40 to move the floating barrier 80 axially within the inner liner 36. The outer ring assembly 126 is retained on the outer container 40 through any suitable means, such as upper and lower annular rims 136 and 138 defined at the upper and lower ends of the outer container 40.

An exemplary magnet arrangement of the actuation assembly will now be described in detail. The floating barrier 80 includes first, second, third, and fourth barrier moving magnets 130a, 103b, 130c, and 130d disposed within openings (not labeled) in the barrier body 82. First, second, third, and fourth clip-in retaining pieces 132a, 132b, 132c, and 132d, respectively, are secured within the openings in the barrier body 82 through snap-fit means or otherwise to retained the magnets therein. It should be appreciated that the first, second, third, and fourth barrier moving magnets 130a, 103b, 130c, and 130d may instead be molded within the barrier body 32 or otherwise secured therein in any other suitable manner.

The first, second, third, and fourth barrier moving magnets 130a, 130b, 130c, and 130d are positioned within the barrier body 82 at four spaced-apart locations on opposite ends of x- and y-axes (which are transverse to a longitudinal axis of the inner liner 36), as shown in FIG. 8. Correspondingly-positioned magnets are positioned within the container body 28 and the outer ring assembly 126 for moving the floating barrier 80 axially within the inner liner 36. Specifically, first, second, third, and fourth container magnet assemblies 142a, 142b, 142c, and 142d are correspondingly positioned within the container body 28 between the inner liner 36 and the outer container 40, and first, second, third, and fourth ring magnets 150a, 150b, 150c, and 150d are correspondingly positioned within a ring body 154 of the outer ring assembly 126.

The first, second, third, and fourth container magnet assemblies 142a, 142b, 142c, and 142d each include an inner magnet 144 that is attracted to the corresponding barrier moving magnet 130a, 130b, 130c, or 130d, and an outer magnet 148 that is attracted to the corresponding ring magnet 150a, 150b, 150c, and 150d. The inner and outer magnets 144 and 148 are opposite polarities such that they are attracted to the corresponding barrier moving magnet and the corresponding ring magnet, but not attracted to each other. The magnet attraction between the ring magnets and the container magnet assemblies and between the container magnet assemblies and the barrier moving magnets causes the axial movement of the outer ring assembly 126 to be transferred to the floating barrier 80.

As noted above, the floating barrier 80 is prevented from rotating within the inner liner 36 due to the elliptical cross-sectional shape of the inner liner 36 and floating barrier 80. As such, the floating barrier 80 slides axially within the inner liner 36 in a tracked manner. The container body 28 may also include suitable structure for ensuring that the container magnet assemblies 142a, 142b, 142c, and 142d move axially between the inner liner 36 and the outer container 40 in a tracked manner (i.e., without rotating). In the depicted embodiment, first, second, third, and fourth channels 146a, 146b, 146c, and 146d are defined between the inner liner 36 and the outer container 40 and are configured to receive the corresponding container magnet assemblies 142a, 142b, 142c, and 142d. The outer ring assembly 126 may be prevented from rotating simply as a result of the magnet attraction between the outer magnet 148 of each container magnet assembly 142a, 142b, 142c, and 142d and the corresponding ring magnet 150a, 150b, 150c, and 150d. In addition thereto, the ring body 154 may include a suitable feature (such as a groove or protrusion) that interfaces with a corresponding feature (such as the other of the groove or protrusion) on the outer container 40 for preventing rotation therebetween.

The inner and outer magnets 144 and 148 are also secured together such that they slide axially together within the container body 28 between the inner liner 36 and the outer container 40. Depending on the location of the first, second, third, and fourth container magnet assemblies 142a, 142b, 142c, and 142d, the inner and outer magnets 144 and 148 are either secured to each other back to back (through adhesive or otherwise), or are instead secured together through one or more magnet connection members 152.

As can be seen by referring to FIG. 8, the elliptical cross-sectional shape of the inner liner 36 creates a smaller gap between the inner liner 36 and the outer container 40 at certain locations. At those tighter gap locations, the inner and outer magnets 144 and 148 of the first and fourth container magnet assemblies 142a and 142d may be secured together back to back. At the larger gap locations, the inner and outer magnets 144 and 148 of the second and third container magnet assemblies 142b and 142c may be secured together with one or more magnet connection members 152 (such as rods). In any event, the inner magnet 144 is positioned near the inner liner 36 for attraction to the corresponding barrier moving magnet, and the outer magnet 148 is positioned near the outer container 40 for attraction to the corresponding ring magnet.

Preferably, however, the inner and outer magnets 144 and 148 are not in contact with any portion of the inner liner 36 or the outer container 40. As is well known in the art, heat transfer and friction occurs when physical contact is made between surfaces. To substantially prevent any friction and/or loss of energy between the contained fluid and the container body 28, a gap is defined between the container magnet assemblies 142a, 142b, 142c, and 142d and the inner liner 36, between the container magnet assemblies 142a, 142b, 142c, and 142d and the structure defining the first, second, third, and fourth channels 146a, 146b, 146c, and 146d, and between the container magnet assemblies 142a, 142b, 142c, and 142d and the outer container 40. As noted above, the inner and outer magnets 144 and 148 of each of the container magnet assemblies 142a, 142b, 142c, and 142d are opposite polarities such that they are attracted to the corresponding barrier moving magnet and the corresponding ring magnet, but not attracted to each other. As such, the container magnet assemblies 142a, 142b, 142c, and 142d effectively "float" within the space defined between inner liner 36 and the outer container 40 as they move axially up and down. Moreover, the tracked axial movement of the floating barrier 80 keeps the container magnet assemblies 142a, 142b, 142c, and 142d and the outer container 40 substantially centered and out of contact with the first, second, third, and fourth channels 146a, 146b, 146c, and 146d. Any other suitable means may be used to substantially prevent contact between the components of the actuation assembly.

The magnets of the actuation assembly are of a suitable strength to overcome any friction between the floating barrier 80 and the inner liner 36. In this manner, the floating barrier 80 can be moved axially within the inner liner 36 when the outer ring assembly 126 is moved axially along the outer container 40. It should be appreciated that fewer or more magnet assemblies may instead be used to appropriately move the floating barrier 80. Moreover, it should be appreciated that with the magnets spaced substantially equally around the floating barrier 80, the floating barrier 80 glides smoothly within the inner liner 36 without substantial axial tilting. More specifically, the four magnetic points of the outer ring assembly 126 move together with the four magnetic points of the floating barrier 80 to move the floating barrier 80 within the inner liner 36 such that a center axis of the floating barrier 80 remains in substantial alignment with a center longitudinal axis of the inner liner 36.

The operation of the fluid insulation assembly 20 for substantially maintaining a steady state temperature of a contained fluid and selectively dispensing the contained fluid, as embodied in the beverage container 24, will now be described. To use the fluid insulation assembly 20, the lid assembly 32 may first be removed by turning the lid body 60 a quarter turn counterclockwise into an unlocked position. When turned, the first and second pins 68 and 70 extending from the lid body 60 travel within opposing bayonet channels 74 in the container body 28 until they reach the vertical channel portion 76 and can be removed vertically therefrom.

In this initial, unlocked position, the first and second barrier attracting magnets 90 and 92 disposed within the lid body 60 are aligned with the first and second lid attracting magnets 84 and 86 in the floating barrier 80 to secure the floating barrier 80 to the lid assembly 32. The lid assembly 32, together with the floating barrier 80 may be thereafter removed from the container body 28, and a hot or cold fluid may be poured within the inner liner 36 of the container body 28.

With a fluid filling the inner liner 36 of the container body 28, the lid assembly 32 together with the floating barrier 80 may be secured back onto the container body 28 for sealing the fluid contained therein. In that regard, the lid assembly 32 is inserted into the upper open end of the container body 28 such that the first and second pins 68 and 70 are received within the vertical channel portion 76 of each bayonet channel 74. The lid assembly 32 is thereafter turned a quarter turn clockwise to allow the first and second pins 68 and 70 to travel within the bayonet channels 74 until they reach the end of the bayonet channels 74 in the second, locked position. When the lid assembly 32 is rotated into the second, locked position, the floating barrier 80 does not rotate with the lid assembly 32 (due to the elliptical cross-sectional shape of the inner liner 36), decoupling the floating barrier 80 from the lid assembly 32.

In a decoupled state, as shown in FIG. 9A, the floating barrier 80 defines the first and second fluid chambers 106 and 108 to seal the fluid within the first fluid chamber 106 and prevent it from contacting any air contained in the second fluid chamber 108. At the same time, the floating barrier 80 may be actuated to slide axially downwardly within the inner liner 36 to move the fluid from the first fluid chamber 106 into the second fluid chamber 108 for consumption or other use. With the floating barrier 80 unlocked from the lid assembly 32, the barrier moving magnets 130a, 130b, 130c, and 130d in the floating barrier 80 may align with the container magnet assemblies 142a, 142b, 142c, and 142d between the inner liner 36 and the outer container 40, which are aligned with the ring magnets 150a, 150b, 150c, and 150d in the outer ring assembly 126. In that regard, the outer ring assembly 126 is moved into a first position near the top of the container body 28 such that it may be used to actuate the floating barrier 80 for dispensing the contained fluid.

Referring to FIG. 9B, the outer ring assembly 126 is moved downwardly axially along the outer container 40 to actuate the floating barrier 80. More specifically, the outer ring assembly 126 is moved downwardly to simultaneously move the container magnet assemblies 142a, 142b, 142c, and 142d and the floating piston 80 downwardly. When the floating piston 80 is displaced axially downwardly, fluid contained within the first fluid chamber 106 is pressurized and displaced upwardly into the second fluid chamber 108 through the first one-way valve 110. The displaced fluid in the second fluid chamber 108 can be consumed through the lid opening 62 either immediately, or after warming up or cooling down for a predetermined amount of time. As can be appreciated, the fluid in the second fluid chamber 108 is in contact with ambient air, and thus, starts to lose energy upon entering the second fluid chamber 108. Accordingly, the second fluid chamber also effectively functions as a warming or cooling chamber for the fluid to be consumed.

When all the fluid has been moved from the first fluid chamber 106 into the second fluid chamber 108 and consumed or otherwise used, the outer ring assembly 126 may be moved back into the first position near the top of the container body 28 such that the container 24 may be reused. To overcome the vacuum effect of the floating piston 80, air can flow from the second fluid chamber 108 into the first fluid chamber 106 through the second one-way valve 112. The outer ring assembly 126, and therefore the floating piston 80 are moved back to the upper end of the container body 28. The lid assembly 32 can then be moved into the unlocked state such that the first and second barrier attracting magnets 90 and 92 disposed within the lid body 60 are aligned with the first and second lid attracting magnets 84 and 86 in the floating barrier 80. In the unlocked state, the lid assembly 32, with the floating barrier 80 attached, may be removed from the container body 28 for reuse, washing, etc.

In an alternative fluid insulation assembly 220, as shown in FIGS. 10A-10D, wherein certain like parts are numbered with like reference numerals except in the '200 series, the actuation assembly may instead be defined by an annular magnet assembly. The annular magnet assembly may include a single annular ring magnet 250 disposed within an outer ring assembly 226, first and second annular container magnets 244 and 248 defining an annular container magnet assembly 242 disposed between an inner liner 236 and an outer container 240 of a container body 228, and a single annular barrier moving magnet 230 disposed within the floating barrier 280.

In this annular magnet embodiment, the inner liner 236 need not be elliptical in shape for ensuring that the annular barrier moving magnet 230 aligns with the annular container magnet assembly 242 and with the annular ring magnet 250. Rather, the annular barrier moving magnet 230 would be aligned with the annular container magnets 244 and 248 and the annular ring magnet 250 in any rotated position. In that regard, the inner liner 236 and the floating barrier 280 may be circular in cross-sectional shape such that the floating barrier 280 may rotate within the inner liner 236.

With the floating barrier 280 rotatable within the inner liner 36, first and second lid-attracting magnets in the floating barrier 280 would not necessarily align with first and second barrier-attracting magnets in the lid assembly 232 when the lid assembly 232 was moved into an unlocked position. As such, the floating barrier 280 could be removed from the inner liner 236 by other means. For instance, a handle 260 or other structure may be defined on an upper surface of the floating barrier 280 for removing the floating barrier 280 from the inner liner 236. Further, the lid assembly 232 could be secured on the container body 228 through other suitable means (such as press fit, threading, etc.), rather than requiring a bayonet connection or the like that predisposes the lid assembly 232 into a specific configuration (such as a quarter turn) in a locked position.

Referring to FIGS. 11A-11C, a second alternative embodiment of a fluid insulation assembly 320, wherein certain like parts are numbered with like reference numerals except in the '300 series, will be briefly described. The fluid insulation assembly 320 is shown in use with an insulated personal beverage container 324, similar to the beverage container 24 described above, having an insulated container body 328 and a lid assembly 332. The fluid insulation assembly 320 includes a barrier assembly for isolating a contained fluid from ambient air that is defined in part by a first barrier 380 disposed within and sealed against the interior of the container 328. In this alternative embodiment, however, the first barrier 380 is located at the bottom of the container body 328 when the fluid is disposed therein. In that regard, the actuator assembly is configured to move the first barrier 380 upwardly within the container body 328 for dispensing contained fluid out of an upper end of a first fluid chamber 306 defined above the first barrier 380, as shown in FIG. 11B.

The actuator assembly is defined by a pump assembly 394 disposed at the bottom end of the container body 328. The pump assembly 394, which in the depicted embodiment is a manual air pump assembly, is configured to selectively pressurize a second fluid chamber 308 defined below the first barrier 380 for moving the first barrier 380 upwardly within the container body 328. Specifically, the pump assembly 394 is used to draw air into the second fluid chamber 308 through a first one-way valve 310, and the pressure of the air within the second fluid chamber 308 moves the first barrier 380 upwardly.

When the first barrier 380 is moved upwardly within the container body 328, as shown in FIG. 11B, the fluid is forced out of the first fluid chamber 306 through a second one-way valve 312 into an optional third fluid chamber 311. The third fluid chamber 311 is defined by a second barrier 360 positioned within the container body 328 near an upper end of the container 324. The fluid may be moved into the third fluid chamber 311 for cooling or warming of the fluid and/or for consumption or other use.

Referring to FIG. 11C, the beverage container 324 may include a removable cup 364 that selectively defines the third fluid chamber 311, which includes a third one-way valve 313 in selective fluid communication with the second one-way valve 312 of the third fluid chamber 311. In this manner, the fluid may be dispensed from the first fluid chamber 306 into the removable cup 364, and the cup 364 may be removed from the container body 328 for consumption of the dispensed fluid. With the cup 364 removed, the second barrier 360 may be removed from the container body 328 for moving the first barrier 380 back into an original position (as shown in FIG. 11A) for re-filling the container 324 with fluid, washing the container 324, etc. The container 324 may instead be disassembled and/or refilled in any other suitable manner.

Referring to FIGS. 12A and 12B, a third alternative embodiment of a fluid insulation assembly 420, wherein certain like parts are numbered with like reference numerals except in the '400 series, will be briefly described. The fluid insulation assembly 420 is shown in use with fluid container 424 having an insulated container body 428 having an upper open end enclosable by a lid assembly 432, and a dispensing spout 462 defined at an upper end of the body 428. The fluid insulation assembly 420 includes a barrier assembly for isolating a contained fluid from ambient air that is defined by a barrier 480 disposed within the interior of the container body 428. The barrier 480 seals against the interior of the container body 428 to define a first fluid chamber 406 below the barrier 480 and a second fluid chamber 408 above the barrier 480. The fluid is contained within the first fluid chamber 406 for maintaining its steady state temperature.

The fluid insulation assembly 420 includes an actuator assembly for moving the barrier 480 axially downwardly within the container body 420 to dispense fluid contained within the first fluid chamber 406. In the depicted embodiment, the actuator assembly is defined by a "French Press" style stem 426 extending upwardly from the barrier 480 and out of the lid assembly 432. The stem 426 may simply be moved axially up and down to correspondingly translate the barrier 480 up and down. It should be appreciated that any suitable telescoping/retractable stem or pump-like stem may instead be used.

As the barrier 480 is moved down by the stem 426, the fluid in the first fluid chamber 406 is pressurized and forced upwardly into the second fluid chamber 408 through a first one-way valve 410. The fluid fills the second fluid chamber 408 for warming/cooling and/or for being dispensed from the spout 462. When all of the fluid has been dispensed from the container 424, the barrier 480 may be removed from the container body 428 by pulling upwardly on the stem 426. A second one-way valve 412 in the barrier 480 allows air to flow from the second fluid chamber 408 into the first fluid chamber 406 to overcome the suction force when removing the barrier 480.

Referring to FIGS. 13A and 13B, a fourth alternative embodiment of a fluid insulation assembly 520, wherein certain like parts are numbered with like reference numerals except in the '500 series, will be briefly described. The fluid insulation assembly 520 is shown in use with a fluid container 524 having an insulated container body 528 with an upper open end enclosable by a lid assembly 532, and a dispensing spout 562 defined at a lower end of the body 528. The fluid insulation assembly 520 includes a barrier assembly for isolating a contained fluid from ambient air that is defined by a barrier 580 disposed within the interior of the container body 528. The barrier 580 seals against the interior of the container body 528 to define a first fluid chamber 506 below the barrier 580 and a second fluid chamber 508 above the barrier 580. The fluid is contained within the first fluid chamber 506 for maintaining its steady state temperature.

The fluid insulation assembly 520 includes an actuator assembly for moving the barrier 580 axially downwardly within the container body 520 to dispense fluid contained within the first fluid chamber 506 out of spout 562. In the depicted embodiment, the actuator assembly is defined by a weighted member 582 either defining a portion of the barrier 580 or disposed on an upper surface of the barrier 580. In other words, the barrier 580 is sufficiently weighted to cause the barrier 580 to move axially downwardly within the container body 520 through gravitational effects to force fluid contained within the first fluid chamber 506 out of spout 562. In the depicted embodiment, the weighted member 582 is defined by ice cubes. In that regard, the fluid contained in the first fluid chamber 506 would be a chilled fluid, and the ice cubes would help maintain the cold temperature of the contained fluid without watering down the fluid. As such, the barrier itself would not require much insulation as the ice cubes would help prevent any heat transfer between the contained fluid and the barrier 580 (and/or the air in the second fluid chamber 508). If a hot fluid was desired, the barrier 580 could be weighted with any suitable weighted member 582 and suitably insulated for preventing energy loss.

To dispense the fluid from the first fluid chamber 506, a first one-way valve 510 in the spout may be opened to allow fluid to flow therethrough. A second one-way valve 512 in the lid assembly 532 allows air to flow into the second fluid chamber 508 to overcome the suction force when moving the barrier 580 axially downwardly within the container body 528. When all of the fluid has been dispensed from the first fluid chamber 506, the barrier 580 may be removed from the container body 528 in any suitable manner.

It should be appreciated that the liquid insulation assembly 520 may be configured for use with any off-the-shelf fluid container since the actuation of the barrier 580 is simply done by the weight of the barrier itself or by a weighted member on top of the barrier 580. Accordingly, the liquid insulation assembly 520 provides at least the benefit of being simple in design, making it cheaper to produce, and adaptable to any suitable container.

Referring to FIGS. 14A and 14B, a fifth alternative embodiment of a fluid insulation assembly 620, wherein certain like parts are numbered with like reference numerals except in the '600 series, will be briefly described. The fluid insulation assembly 620 is shown in use with fluid container 624 having an insulated container body 628 with an upper open end enclosable by a lid assembly 632, and a dispensing spout 662 defined near a lower end of the body 628. The fluid insulation assembly 620 includes a barrier assembly for isolating a contained fluid from ambient air that is defined by a barrier 680 disposed within the interior of the container body 628. The barrier 680 seals against the interior of the container body 628 to define a first fluid chamber 606 below the barrier 680 and a second fluid chamber 608 above the barrier 680. The fluid is contained within the first fluid chamber 606 for maintaining its steady state temperature.

The fluid insulation assembly 620 includes an actuator assembly for moving the barrier 680 axially downwardly within the container body 620 to dispense fluid contained within the first fluid chamber 606 out of spout 662. The actuator assembly is defined by a pre-charged energy source, such as a biasing member, pressurized air, etc., suitable for moving the barrier 680. In the depicted embodiment, the actuator assembly is a compression spring 626 that is disposed within the second fluid chamber 508 in a compressed state between the lid assembly 632 and the barrier 680. The compression spring 626 extends to move the barrier 680 axially downwardly within the container body 620 when a first one-way valve 610 is opened to allow fluid to flow out of the spout 662. A second one-way valve 612 in the lid assembly 632 allows air to flow into the second fluid chamber 608 to overcome the suction force when moving the barrier 680 axially downwardly within the container body 628. When all of the fluid has been dispensed from the first fluid chamber 606, the barrier 680 may be removed from the container body 628 in any suitable manner.

Figure 15:
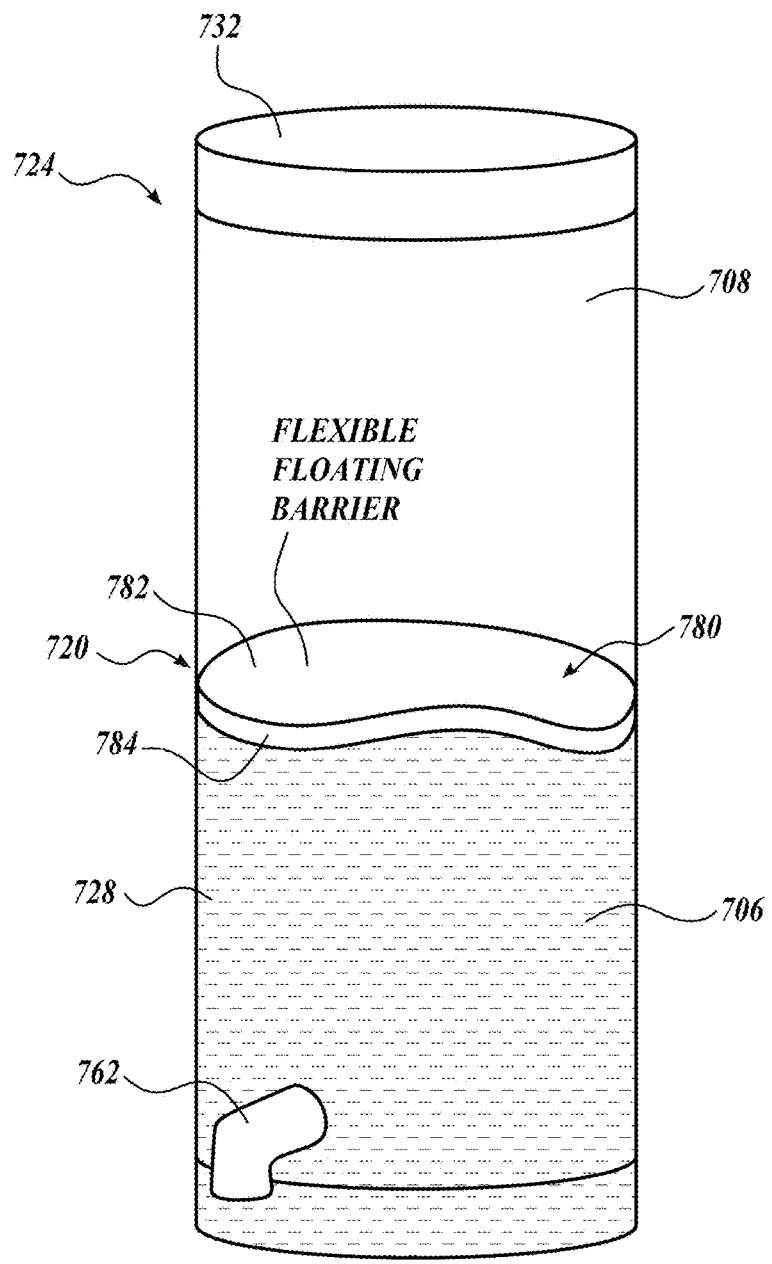
FIG. 15 is a side cross-sectional view of a fluid insulation assembly formed in accordance with a sixth alternative exemplary embodiment of the present disclosure, wherein a barrier assembly is shown in a first position.

Referring to FIG. 15, a sixth alternative embodiment of a fluid insulation assembly 720, wherein certain like parts are numbered with like reference numerals except in the '700 series, will be briefly described. The fluid insulation assembly 720 is shown in use with fluid container 724 having an insulated container body 728 with an upper open end enclosable by a lid assembly 732, and a dispensing spout 762 defined at a lower end of the body 728.

The fluid insulation assembly 720 includes a barrier assembly for isolating a contained fluid from ambient air that is defined by a barrier 780 disposed within the interior of the container body 728. The barrier 780 seals against the interior of the container body 728 to define a first fluid chamber 706 below the barrier 780 and a second fluid chamber 708 above the barrier 780, wherein the fluid is contained within the first fluid chamber 706 for maintaining its steady state temperature.

The barrier 780 is comprised of a flexible or semi-flexible body 782 having a suitable amount of insulation for the desired end use. The body 782 may be sufficiently flexible, for instance, to conform to a contoured shape of the bottom of the container body 728 to help dispense substantially all the fluid out of the first fluid chamber 706. A flexible sealing edge 784 extends around the circumference of the body 782 for sealing against the interior of the container body 728. The flexible sealing edge 784 is made from a suitable material, such as silicone or the like, such that it may seal against and conform to the interior of the container body 728 as the barrier 780 is moved axially within the container body 728. In that regard, the overall diameter of the barrier 780 is at least somewhat larger than the interior diameter of the container body 728 such that the flexible sealing edge 784 deforms upwardly as the barrier 780 is moved downwardly within the container body 728, effectively creating a vacuum within the container body 728.

The fluid insulation assembly 720 includes an actuator assembly for moving the barrier 780 axially downwardly within the container body 720 to dispense fluid contained within the first fluid chamber 706 out of spout 762. Any suitable actuator assembly shown and described with reference to FIGS. 1-14 above or FIGS. 16 and 17 below may be used for moving the barrier 780 axially downwardly within the container body 720. Further, any other suitable actuator assembly may instead be used.

To dispense the fluid from the first fluid chamber 706, a first one-way valve (not shown) in the spout 762 may be opened to allow fluid to flow therethrough. A second one-way valve (not shown) in the lid assembly 732 allows air to flow into the second fluid chamber 708 to overcome the suction force when moving the barrier 780 axially downwardly within the container body 728. When all of the fluid has been dispensed from the first fluid chamber 706, the barrier 780 may be removed from the container body 728 in any suitable manner.

Figure 16:
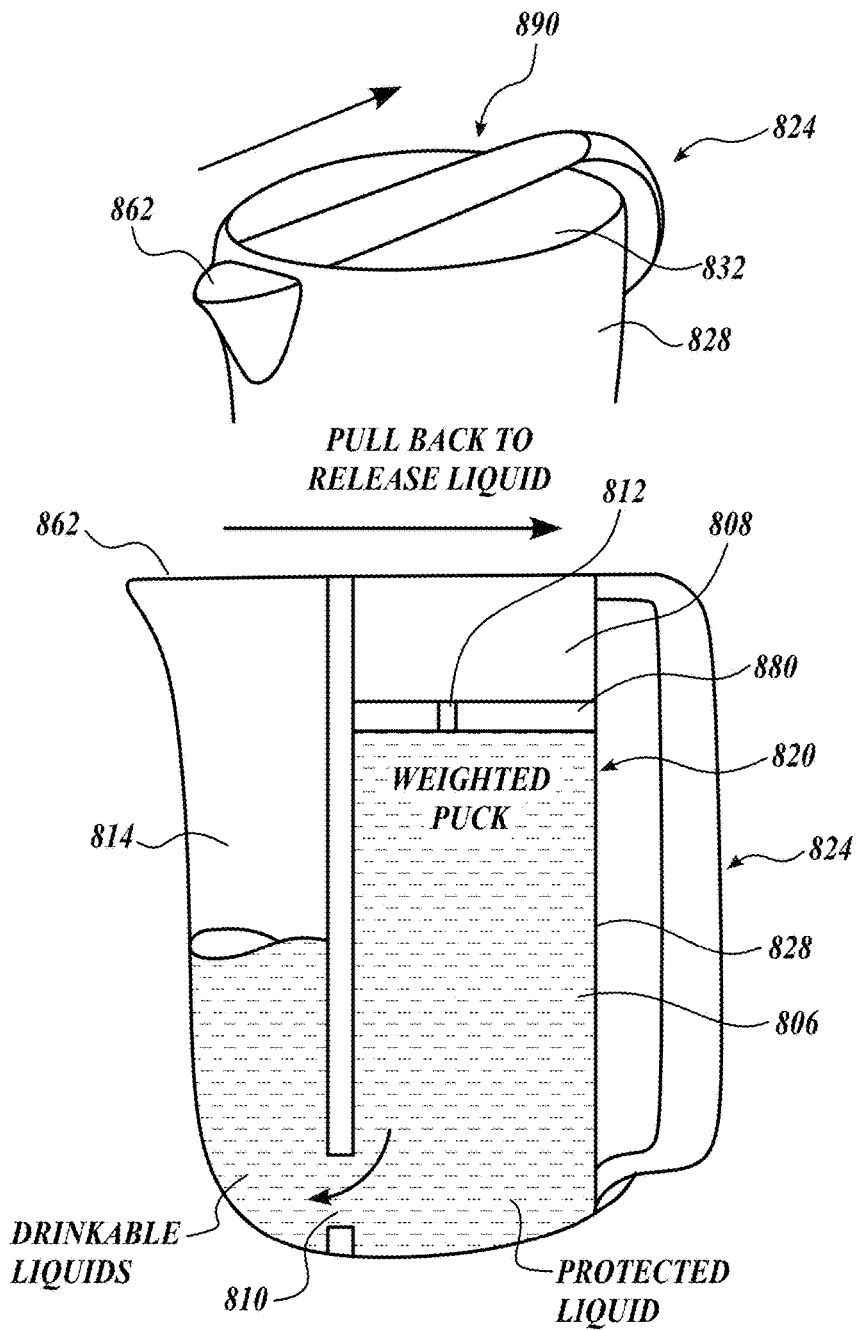
FIG. 16 is a side cross-sectional view of a fluid insulation assembly formed in accordance with a seventh alternative exemplary embodiment of the present disclosure, wherein a barrier assembly is shown in a first position.

Referring to FIG. 16, a seventh alternative embodiment of a fluid insulation assembly 820, wherein certain like parts are numbered with like reference numerals except in the '800 series, will be briefly described. The fluid insulation assembly 820 is shown in use with fluid container 824 having an insulated container body 828 with an upper open end enclosable by a lid assembly 832, and a dispensing spout 862 defined at an upper end of the body 828. The spout 862 is selectively opened and closed with a slidable handle assembly 890.

The fluid insulation assembly 820 includes a barrier assembly for isolating a contained fluid from ambient air that is defined by a barrier 880 disposed within the interior of the container body 828. The barrier 880 seals against the interior of the container body 828 to define a first fluid chamber 806 below the barrier 880 and a second fluid chamber 808 above the barrier 880, wherein the fluid is contained within the first fluid chamber 806 for maintaining its steady state temperature. A third fluid chamber 814 is defined within the container body 828, and fluid may pass from the first fluid chamber 806 into the third fluid chamber 814 such that the fluid may be warmed/cooled and/or dispensed through the spout 862 for consumption or other use. In that regard, the portion of the container body 828 defining the third fluid chamber 814 may be clear or transparent such that the fluid contained therein may be visible to a user. A first one-way valve 810 is defined between the first and third fluid chambers 806 and 814 that allows fluid to pass from the first fluid chamber 806 into the third fluid chamber 814 when the barrier 880 is moved axially downwardly within the container body 820.

In that regard, the fluid insulation assembly 820 includes an actuator assembly for moving the barrier 880 axially downwardly within the container body 820 to dispense fluid contained within the first fluid chamber 806 into the third fluid chamber 814. Any suitable actuator assembly shown and described with reference to FIGS. 1-14 above or FIGS. 16 and 17 below, or any other suitable actuator assembly may be used for moving the barrier 880 axially downwardly within the container body 820. The actuator assembly may be activated when the slidable handle assembly 890 is used to open the spout 862.

When all of the fluid has been dispensed from the first fluid chamber 806, the barrier 880 may be removed from the container body 828 in any suitable manner. A second one-way valve 812 in the barrier 880 allows air to flow into the first fluid chamber 806 to overcome the suction force when removing the barrier 880 from the container body 728.

Referring to FIG. 17, an eighth alternative embodiment of a fluid insulation assembly 920, wherein certain like parts are numbered with like reference numerals except in the '900 series, will be briefly described. The fluid insulation assembly 920 is shown in use with a flexible fluid container 924 having an insulated flexible container body 928 with an upper opening enclosable by a cap assembly 932 that defines a dispensing spout 962.

The fluid insulation assembly 920 includes a barrier assembly for isolating a contained fluid from ambient air for maintaining its steady state temperature. The barrier assembly is defined by a flexible bag barrier 980 disposed within the interior of the container body 928 that creates a first fluid chamber 906 for containing the fluid and a second fluid chamber 908 interior of the container body 928 and exterior of the flexible bag barrier 980 for containing air or another gaseous fluid. The first fluid chamber 906 is in fluid communication with the spout 962 through a first one-way valve 910. The second fluid chamber 906 is in fluid communication with the spout 962 through a second one-way valve 912.

The fluid insulation assembly 920 includes an actuator assembly for compressing the flexible bag barrier 980 to pressurize and dispense fluid out of the first fluid chamber 906 through the first one-way valve 910. The actuator assembly is defined in part by the flexible container body 928 that may be squeezed to compress the flexible bag barrier 980. More specifically, the flexible container body 928 may be moved from a first, un-squeezed configuration (see FIG. 17a) to a second, squeezed configuration (see FIG. 17b) to compress the flexible bag barrier 980. As the flexible bag barrier 980 is compressed, the fluid contained within the first fluid chamber 906 is pressurized and dispensed out of the first one-way valve 910.

To preserve the insulating effects of the fluid insulation assembly 920, however, air is not allowed to be sucked back into the first fluid chamber 906 after the container body 928 is released back into the first, un-squeezed configuration (see FIG. 17c). Rather, air passes into the second fluid chamber 908 through the second one-way valve 912 to relieve the vacuum effect caused by the squeezed container body 928.

It should be appreciated that the barrier of any of the above-described barrier assemblies may be suitably insulated to help prevent any energy loss through the barrier. Moreover, it should be appreciated that any of the exemplary fluid insulation assemblies may be adapted for use with any suitable fluid container. Further, although the exemplary fluid insulation assemblies of the present disclosure are described for use with fluids to be consumed, it should be appreciated that the fluid insulation assemblies may be used for any suitable application. Accordingly, the embodiments shown and described herein should not be construed as limiting the scope of the claimed subject matter.

The detailed description set forth above in connection with the appended drawings is intended as a description of exemplary embodiments of the disclosed subject matter and is not intended to represent the only embodiments. The exemplary embodiments described in this disclosure are provided merely as examples or illustrations of a fluid insulation assembly and should not be construed as preferred or advantageous over other embodiments. The illustrative examples provided herein are not intended to be exhaustive or to limit the disclosure to the precise forms disclosed. Similarly, any features and/or process steps described herein may be interchangeable with other features and/or process steps, or combinations of features and/or process steps, in order to achieve the same or substantially similar result.

In the foregoing description, numerous specific details are set forth in order to provide a thorough understanding of the exemplary embodiment of the present disclosure. It will be apparent to one skilled in the art, however, that many embodiments of the present disclosure may be practiced without some or all of the specific details. In some instances, well-known subassemblies and/or process steps have not been described in detail in order not to unnecessarily obscure various aspects of the present disclosure. Further, it will be appreciated that embodiments of the present disclosure may employ any combination of features described herein.

The present disclosure includes references to directions, such as "inner," "outer," "upward," "downward," "top," "bottom," "first," "second," etc. These references and other similar references in the present disclosure are only to assist in helping describe and understand the exemplary embodiments and are not intended to limit the claimed subject matter to these directions. The present disclosure may also reference quantities and numbers. Unless specifically stated, such quantities and numbers are not to be considered restrictive, but exemplary of the possible quantities or numbers associated with the present disclosure. Also in this regard, the present disclosure may use the term "plurality" to reference a quantity or number. In this regard, the term "plurality" is meant to be any number that is more than one, for example, two, three, four, five, etc. The terms "about," "approximately," etc., means plus or minus 5% of the stated value.

While illustrative embodiments have been illustrated and described, it will be appreciated that various changes can be made therein without departing from the spirit and scope of the present disclosure.

The embodiments of the present disclosure in which an exclusive property or privilege is claimed are defined as follows:

1. A fluid insulation assembly of a container having an insulated first fluid chamber configured to contain a fluid, the fluid insulation assembly comprising:
   an actuation assembly configured to dispense the fluid from the insulated first fluid chamber into a second fluid chamber of the container that is not isolated from ambient air; and
   a barrier assembly configured to fluidly isolate the fluid within the insulated first fluid chamber from ambient air as the fluid is dispensed from the insulated first fluid chamber into the second fluid chamber, wherein the actuation assembly is configured to move the barrier assembly in a first direction for dispensing the fluid from the insulated first fluid chamber, and wherein the barrier assembly includes at least one barrier magnet that is alignable with at least one magnet of the actuation assembly such that the barrier assembly moves when the at least one magnet of the actuation assembly is moved, and wherein the container includes an inner liner and an outer container, and wherein at least one container magnet assembly is disposed between the inner liner and the outer container, and wherein at least one outer ring magnet is disposed exterior of the outer container.

2. The assembly of claim 1, wherein the second fluid chamber is selectively removable from the container.

3. The assembly of claim 1, wherein the barrier assembly includes a valve assembly configured to selectively allow the fluid to flow out of the insulated first fluid chamber without allowing ambient air to pass into the insulated first fluid chamber when the barrier assembly is moved in the first direction.

4. The assembly of claim 3, wherein the valve assembly selectively allows ambient air to flow into the insulated first fluid chamber when the barrier assembly is moved in a second direction.

5. The assembly of claim 1, wherein the at least one barrier magnet is magnetically attracted to the at least one container magnet assembly, and wherein the at least one container magnet assembly is magnetically attracted to the at least one outer ring magnet.

6. The assembly of claim 1, wherein the insulated first fluid chamber is defined by a portion of the inner liner.

* * * * *